(12) United States Patent
Tashiro

(10) Patent No.: US 11,137,962 B1
(45) Date of Patent: Oct. 5, 2021

(54) METHOD AND SYSTEM FOR VISUALIZATION AND COMPARISON ANALYSIS BETWEEN PRINTERS

(71) Applicant: Konica Minolta Business Solutions U.S.A., Inc., Ramsey, NJ (US)

(72) Inventor: Masayuki Tashiro, San Mateo, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 0 days.

(21) Appl. No.: 16/834,111

(22) Filed: Mar. 30, 2020

(51) Int. Cl.
*G06F 3/12* (2006.01)
*G06T 11/20* (2006.01)

(52) U.S. Cl.
CPC ......... *G06F 3/1259* (2013.01); *G06F 3/1204* (2013.01); *G06F 3/1207* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 9,417,829 B2 * | 8/2016 | Sheldon | G06F 3/1204 |
| 10,576,688 B2 * | 3/2020 | Matsuda | B29C 64/393 |
| 2014/0009788 A1 * | 1/2014 | Shiraki | G06F 3/1285 |
| | | | 358/1.15 |
| 2014/0118775 A1 * | 5/2014 | Motamed | G06F 3/1203 |
| | | | 358/1.15 |
| 2016/0216923 A1 * | 7/2016 | Willamowski | G06F 3/1285 |
| 2016/0255209 A1 * | 9/2016 | Zakharov | G06T 11/206 |
| | | | 358/1.15 |
| 2018/0275845 A1 * | 9/2018 | Barbee | G06F 3/0481 |
| 2019/0146728 A1 * | 5/2019 | Ormond | G06F 3/1207 |
| | | | 358/1.15 |
| 2019/0392032 A1 * | 12/2019 | Yasui | G06F 16/367 |

OTHER PUBLICATIONS

Canon's PRISMAlytics, Quick Reference Guide Dashboard, Edition: Jun. 2017, (Publication Date—2017), pp. 1-27.

* cited by examiner

*Primary Examiner* — Henok Shiferaw
(74) *Attorney, Agent, or Firm* — Buchanan Ingersoll & Rooney PC

(57) ABSTRACT

A method, a non-transitory computer readable medium, and a system are disclosed for comparing usage of plural printers. The method includes collecting print information on each of a plurality of printers, the print information including print volume, printer run time, printer print time, printer stop time, and raster image processing time; and displaying, on a graphical user interface, a printer usage dashboard, the printer usage dashboard including a line chart of print volume for the plurality of printers, a bar chart of printer stop time for each of the plurality of printers, and a scatter chart of printer usage for the plurality of printers.

20 Claims, 22 Drawing Sheets

| Word | Description | Can Operator resolve? | Example |
|---|---|---|---|
| Job | Print Request | | |
| Operator | Person who operate Printer | | |
| PrintVolume | Page count x Copy count | | |
| Printer Running Time | Time that Printer is turned on. | | |
| Printer Printing Time | Time that Printer is actually printing. PrinterPrintingTime = PrinterRunningTime - PrinterStopTime | | |
| Printer Stop Time | There are three categories (Maintenance, Idle and Error). | | |
| | Maintenance - Service call (Engine) | No | Case 1 in FIG. 7 |
| | Idle - No Job | No | Case 2.1 in FIG. 8 |
| | Idle - RIP (Controller) | No | Case 2.2 in FIG. 8 |
| | Idle - Operations* (Engine) *PanelOperation/FrontDoorOpen/PaperFeedTrayOpen/PaperTrayFull/PaperTrayEmpty/TonerEmpty | Yes | Case 2.3 in FIG. 8 |
| | Idle - Others (Engine) | No | Case 2.4 in FIG. 8 |
| | Error - Errors* (Engine) *JAM etc. | Yes or No | Case 3 in FIG. 9 |
| RIP | Raster Image Processing - Convert a job to Raster Image for printing | | |

Standard (by Konica Minolta)

| Maker | Model | PPM | Standard Usage rate (%) | line (-10%) | line (standard) | line (+10%) |
|---|---|---|---|---|---|---|
| Konica Minolta | Model A | 80 | 80% | y=0.00536*x | y=0.00313*x | y=0.00139*x |
| Konica Minolta | Model B | 100 | 75% | y=0.00558*x | y=0.00333*x | y=0.00176*x |
| Konica Minolta | Model C | 136 | 60% | y=0.00735*x | y=0.0049*x | y=0.00313*x |
| CompanyA | Unknown | 80 | | | | |
| CompanyA | Unknown | 136 | | | | |

*This is assumption.

1700

<How to calculate gradient>

FIG. 17B

| line (standard) | PrinterRunningTime*{1 - Standard Usage rate}/PPM*RunningTime*Standard Usage rate |
| line (-Δ%) | PrinterRunningTime*{1 - (Standard Usage rate - Δ)}/PPM*RunningTime*(Standard Usage rate - Δ) |
| line (+Δ%) | PrinterRunningTime*{1 - (Standard Usage rate + Δ)}/PPM*RunningTime*(Standard Usage rate + Δ) |

1710

Sample data (for 1 week)

| IPAddress | Maker | Model | PPM | PrintVolume | PrinterStopTime (mins) | Actual Usage rate (%) | Maintenance (mins) | Idle (mins) | Error (mins) |
|---|---|---|---|---|---|---|---|---|---|
| 10.111.222.1 | Konica Minolta | Model A | | 80 | 167040 | 87% | 24 | 216 | 72 |
| 10.111.222.2 | Konica Minolta | Model A | | 80 | 163200 | 85% | 24 | 263 | 72 |
| 10.111.222.3 | Konica Minolta | Model A | | 80 | 149760 | 78% | 24 | 432 | 72 |
| 10.111.222.4 | Konica Minolta | Model A | | 80 | 145920 | 76% | 480 | 24 | 72 |
| 10.111.222.5 | Konica Minolta | Model A | | 80 | 86400 | 45% | 24 | 24 | 1272 |
| 10.111.222.6 | Konica Minolta | Model B | | 100 | 129600 | 54% | 192 | 780 | 144 |
| 10.111.222.7 | Konica Minolta | Model B | | 100 | 139200 | 58% | 168 | 744 | 96 |
| 10.111.222.8 | Konica Minolta | Model B | | 100 | 124800 | 52% | 120 | 840 | 312 |
| 10.111.222.9 | Konica Minolta | Model B | | 100 | 156000 | 65% | 120 | 960 | 120 |
| 10.111.222.10 | Konica Minolta | Model C | | 136 | 212160 | 65% | 600 | 120 | 120 |
| 10.111.222.11 | Konica Minolta | Model C | | 136 | 189312 | 58% | 240 | 528 | 240 |
| 10.111.222.12 | Konica Minolta | Model C | | 136 | 195840 | 60% | 240 | 240 | 480 |
| 10.111.222.13 | CompanyA | Unknown | | 80 | 153600 | 80% | 120 | 120 | 240 |
| 10.111.222.14 | CompanyA | Unknown | | 136 | 228480 | 70% | 120 | 120 | 480 |

<Base Information for Sample data>

| | minutes | 1 week (8 hours x 5 days) |
|---|---|---|
| PrinterRunningTime | 2400 | |
| Printers | 14 units | |

FIG. 18

Standard (by Konica Minolta)

| Category | Maker | Model | PPM | Standard Usage rate (%)* | line (-10%) | line (standard) | line (+10%) |
|---|---|---|---|---|---|---|---|
| Standard (by Konica Minolta) | Konica Minolta | Model B | 100 | 75% | y=0.00538*x | y=0.00333*x | y=0.00176*x |
| Adjusted standard | Konica Minolta | Model B | 100 | 54% | y=0.01275*x | y=0.00852*x | y=0.00563*x |

<How to adjust: Use average of usage rate>

| Model B | Usage rate | Idle(RIP) rate | Error (JAM) rate | Others rate |
|---|---|---|---|---|
| Standard by Konica Minolta | 75% | 2% | 10% | 19% |
| Average of Model B | 54% | 24% | 12% | 14% |
| 10.111.222.6 in user's site | 54% | 25% | 12% | 13% |
| 10.111.222.7 in user's site | 58% | 20% | 9% | 21% |
| 10.111.222.8 in user's site | 52% | 22% | 15% | 13% |
| 10.111.222.9 in user's site | 50% | 30% | 13% | 7% |

Action A for usage improvement: Upgrade CPU for controller => Usage is improved by 10%

2100

| Model B | Current | | | | Adjusted (Prediction) after Action A | | | |
|---|---|---|---|---|---|---|---|---|
| | Usage rate | Idle(RIP) rate | Error (JAM) rate | Others rate | Usage rate | Idle(RIP) rate | Error (JAM) rate | Others rate |
| Standard by Konica Minolta | 75% | 2% | 10% | 19% | 75% | 2% | 10% | 19% |
| 10.111.222.6 in user's site | 54% | 25% | 12% | 13% | 64% | 15% | 12% | 13% |
| 10.111.222.7 in user's site | 58% | 20% | 9% | 21% | 68% | 10% | 9% | 21% |
| 10.111.222.8 in user's site | 52% | 22% | 15% | 13% | 62% | 12% | 15% | 13% |
| 10.111.222.9 in user's site | 50% | 30% | 13% | 7% | 60% | 20% | 13% | 7% |

FIG. 21B

Action B for usage improvement: Replace with 4 Model X* (New generation of Model B) => Usage is improved by 12-18%.

2110

| Model B | Current | | | | Adjusted (Prediction) after Action B | | | |
|---|---|---|---|---|---|---|---|---|
| | Usage rate | Idle(RIP) rate | Error (JAM) rate | Others rate | Usage rate | Idle(RIP) rate | Error (JAM) rate | Others rate |
| Standard by Konica Minolta | 75% | 2% | 10% | 19% | 75% | 2% | 8% | 15% |
| 10.111.222.6 in user's site | 54% | 25% | 12% | 13% | 67% | 10% | 8% | 15% |
| 10.111.222.7 in user's site | 58% | 20% | 9% | 21% | 72% | 5% | 8% | 15% |
| 10.111.222.8 in user's site | 52% | 22% | 15% | 13% | 70% | 7% | 8% | 15% |
| 10.111.222.9 in user's site | 50% | 30% | 13% | 7% | 62% | 15% | 8% | 15% |

*Better controller spec and PPM than Model B

METHOD AND SYSTEM FOR VISUALIZATION AND COMPARISON ANALYSIS BETWEEN PRINTERS

FIELD

The present disclosure relates to a method and system for visualization and comparison analysis between printers, for example, for a plurality of printers in a print shop.

BACKGROUND

Applications are known that show usage of printers on a user interface (UI). However, the applications do not show a comparison and/or an analysis between printers such that it can be difficult for an administrator or operator to visually understand each printer's usage compared to other printers, for example, in a print shop. However, it is difficult to quickly see how each printer is performing relatively quickly with a high level of confidence without be able to visually observe the usage rate of each of the printers relative to one another and without an ability to observe opportunities to improve, for example, throughput by increasing number of pages printed, quality of print, and/or other variables It would be desirable for the administrator or operator to understand the performance of each printer by being able to visually see areas in which improvement can be obtained.

SUMMARY

In consideration of the above issues, it would be desirable to have a method and system for visualizing and comparison analysis between printers by visualizing displaying, for example, in a chart of graph, a comparison among plural printers, for example, in a print shop. In addition, it would be desirable to enable users to understand how each printer of plural printers is performing, for example, by adding a chart or graph, which depicts areas in which improvement in the print process can be shown to an administrator, and allow users to consider about more actions to improve their machine's usage on the user interface (UI).

In accordance with an exemplary embodiment, a method is disclosed for comparing usage of plural printers, the method comprising: collecting print information on each of a plurality of printers, the print information including print volume, printer run time, printer print time, printer stop time, and raster image processing time; and displaying, on a graphical user interface, a printer usage dashboard, the printer usage dashboard including a line chart of print volume for the plurality of printers, a bar chart of printer stop time for each of the plurality of printers, and a scatter chart of printer usage for the plurality of printers.

In accordance with another exemplary embodiment, a non-transitory computer readable medium (CRM) storing computer program code executed by a computer processor that performs a process for comparing usage of plural printers is disclosed, the process comprising: collecting print information on each of a plurality of printers, the print information including print volume, printer run time, printer print time, printer stop time, and raster image processing time; and displaying, on a graphical user interface, a printer usage dashboard, the printer usage dashboard including a line chart of print volume for the plurality of printers, a bar chart of printer stop time for each of the plurality of printers, and a scatter chart of printer usage for the plurality of printers.

In accordance with an exemplary embodiment, a system is disclosed for comparing usage of plural printers, the system comprising: a plurality of printers, each of the plurality of printers configured to print a plurality of print jobs; a computer processor, the computer processor configured to: collect print information on each of the plurality of printers, the print information including print volume, printer run time, printer print time, printer stop time, and raster image processing time; and a graphical user interface configured to display a printer usage dashboard, the printer usage dashboard including a line chart of print volume for the plurality of printers, a bar chart of printer stop time for each of the plurality of printers, and a scatter chart of printer usage for the plurality of printers.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a table of definitions in accordance with an exemplary embodiment.

FIG. 17A is a chart illustrating capabilities of a plurality of printers in accordance with an exemplary embodiment.

FIG. 17B is an illustration of how to calculate gradient in accordance with an exemplary embodiment.

FIG. 18 is an illustration of a chart showing data from a plurality of printers in accordance with an exemplary embodiment.

FIG. 19A is an illustration of a chart illustrating print capabilities of printer in accordance with an exemplary embodiment.

FIG. 19B is an illustration of a chart illustrating how to adjust usage in accordance with an exemplary embodiment.

FIG. 21A is an illustration of chart showing a first action for usage improvement for a plurality of printers in accordance with an exemplary embodiment.

FIG. 21B is an illustration of chart showing a second action for usage improvement for a plurality of printers in accordance with an exemplary embodiment.

DETAILED DESCRIPTION

Figure 1:
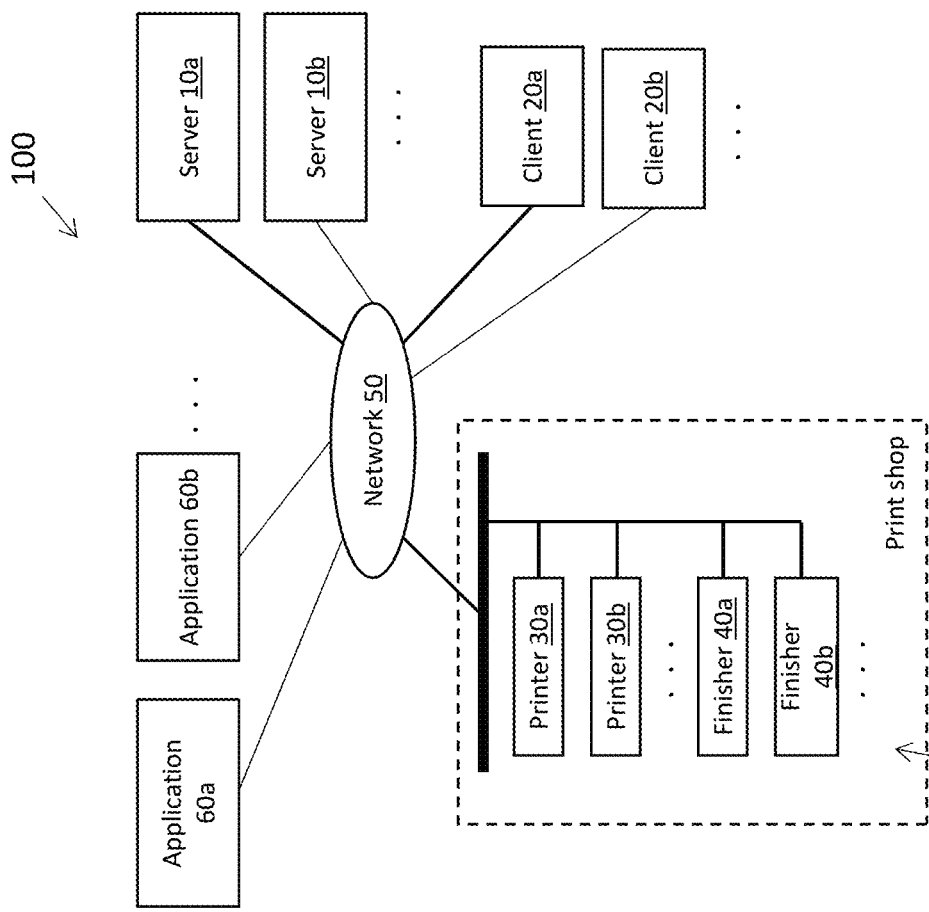
FIG. 1 is an illustration of a system for efficient job scheduling by collecting data from multiple sources in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for visualization and comparison analysis between printers in accordance with an exemplary embodiment. As shown in FIG. 1, the system 100 includes one or more servers 10a, 10b, one or more client devices 20a, 20b, one or more printers 30a, 30b, one or more finishers 40a, 40b, a communication network 50, and one or more applications 60a, 60b. In accordance with an exemplary embodiment, the one or more printers 30a, 30b, and the one or more finishers 40a, 40b, can be, for example, in a print shop 70. The communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, each of the one or more client devices 20a, 20b, can be, for example, a personal computer (PC), a laptop, a mobile computing device (e.g., tablet PC, smartphone, etc.), a server, a mainframe, or a kiosk. As shown in FIG. 1, each of the one or more servers 10a, 10b, the one or more client devices 20a, 20b, the one or more printers 30a, 30b, the one or more finishers 40a, 40b, and the one or more applications 60a, 60b, can be connected to each other by one or more communication networks 50 of any size having wired and/or wireless segments. Each of the one or more client devices 20a, 20b, can be operated by a different user (for example, individual or Customer, company, etc.) and is configured to issue print jobs.

Figure 2:
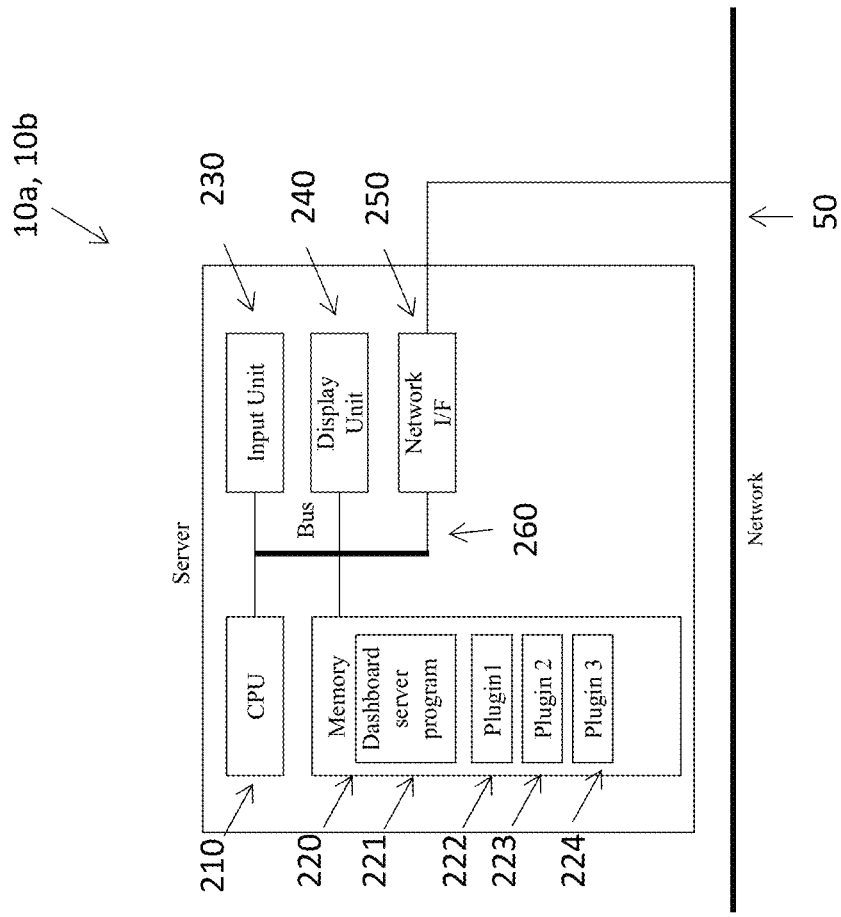
FIG. 2 is an illustration of a server in accordance with an exemplary embodiment.

FIG. 2 is an illustration of a server 10a, 10b in accordance with an exemplary embodiment. As shown in FIG. 2, each of the one or more servers 10a, 10b can include a processor or central processing unit (CPU) 210, and one or more memories 220 for storing software programs and data, which can include a dashboard server program 221, and a plurality of plugins, for example, Plugin 1 222, Plugin 2 223, and Plugin 3 224. Each of the plurality of plugins 222, 223, 224, can be a software component that adds a specific feature to an existing computer program as disclosed herein. The processor or CPU 220 is configured to carry out the instructions of a computer program, which operates and/or controls at least a portion of the functionality of the server 10a, 10b. The server 10a, 10b can also include an input unit 230, a display unit or graphical user interface (GUI) 240, and a network interface (I/F) 250, which is connected to a communication network (or network) 50. A bus 260 can connect the various components 210, 220, 230, 240, and 250 within server 10a, 10b. The server 10a, 10b includes an operating system (OS), which manages the computer hardware and provides common services for efficient execution of various software programs as disclosed herein.

Figure 3:
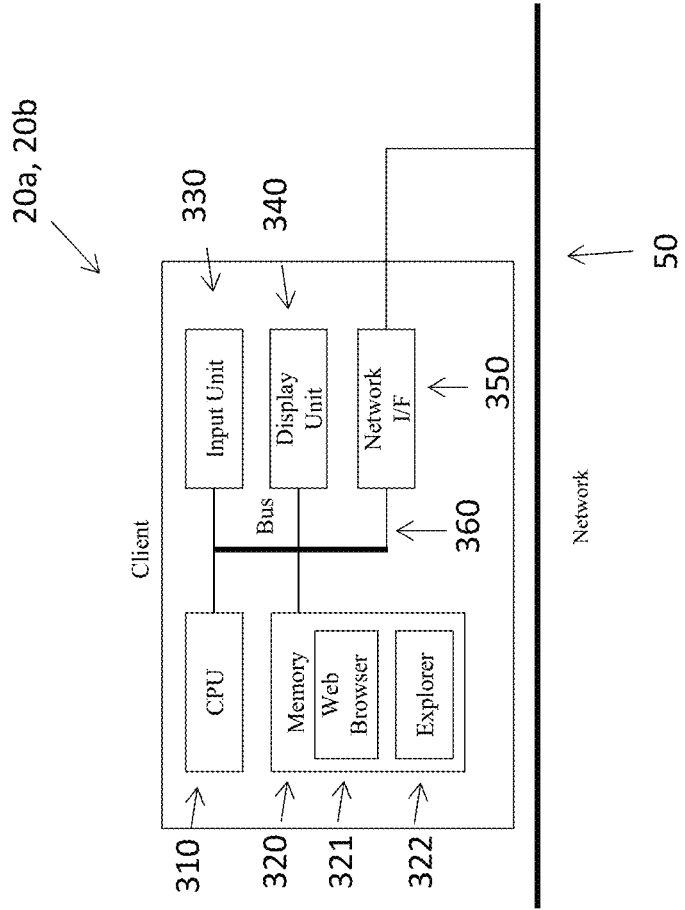
FIG. 3 is an illustration of a client device or client computer in accordance with an exemplary embodiment.

FIG. 3 is an illustration of a client device or client computer 20a, 20b in accordance with an exemplary embodiment. As shown in FIG. 3, the client device or client computer 20a, 20b the exemplary host computer or client computer 20 can include a processor or central processing unit (CPU) 310, and one or more memories 320 for storing software programs and data (such as files to be printed), and a web browser 321, for example, Internet Explorer 322. The processor or CPU 310 carries out the instructions of a computer program, which operates and/or controls at least a portion of the functionality of the client computer 20a, 20b. The client computer 20a, 20b can also include an input unit 330, a display unit or graphical user interface (GUI) 340, and a network interface (I/F) 350, which is connected to a communication network (or network) 50. A bus 360 can connect the various components 310, 320, 330, 340, and 350 within the client computer 20a, 20b.

The client computer 20a, 20b includes an operating system (OS), which manages the computer hardware and provides common services for efficient execution of various software programs. The software programs can include, for example, application software and printer driver software. In addition, the printer driver software can control transmission of the print job from the client computer 20a, 20b to the one or more servers 10a, 10b, the one or more printers or printing devices 30a, 30b, and the one or more finishers 40a, 40b.

Figure 4:
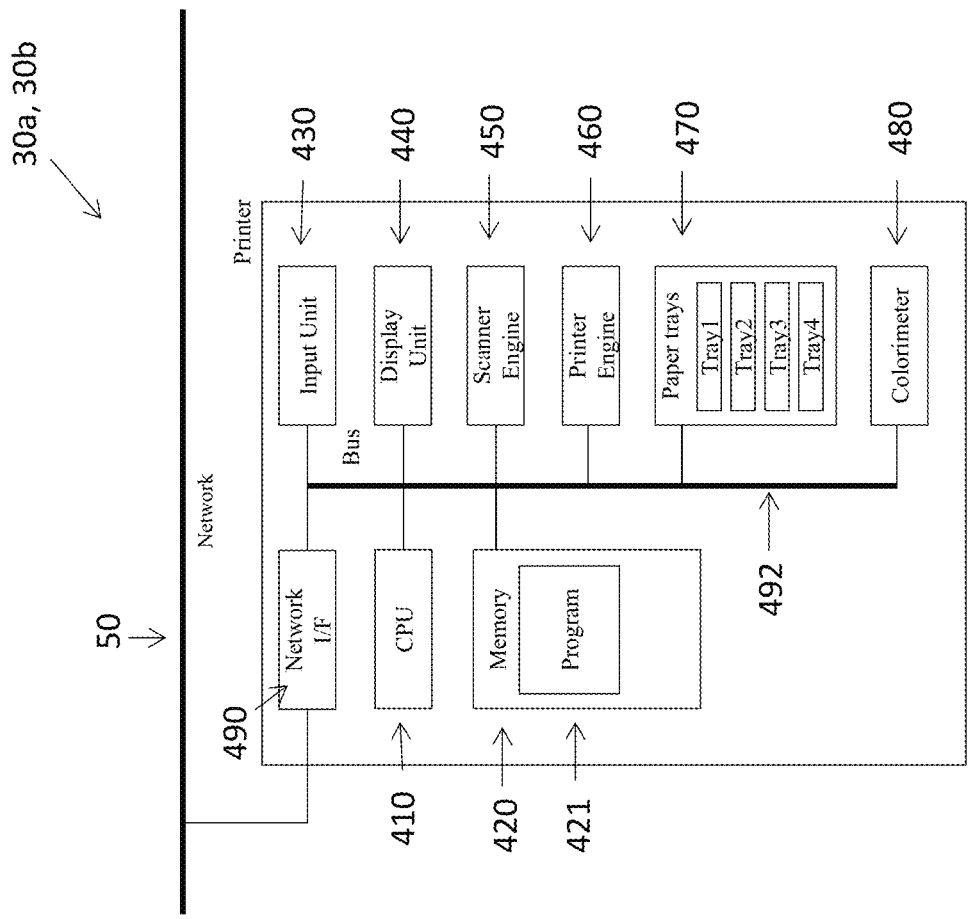
FIG. 4 is an illustration of a printer or printing device in accordance with an exemplary embodiment.

FIG. 4 is an illustration of a printer or printing device 30a, 30b in accordance with an exemplary embodiment. As shown in FIG. 4, the printer or printing device 30a, 30b can include a network interface (I/F) 490, which is connected to the communication network (or network) 50, a processor or central processing unit (CPU) 410, and one or more memories 420 for storing software programs and data (such as files to be printed) 421. For example, the software programs 421 can include a printer controller and a tray table. The processor or CPU 410 carries out the instructions of a computer program, which operates and/or controls at least a portion of the functionality of the printer 30a, 30b. The printer 30a, 30b can also include an input unit 430, a display unit or graphical user interface (GUI) 440, a scanner engine (or scanner) 450, a printer engine 460, a plurality of paper trays 470, and a colorimeter 480.

In accordance with an exemplary embodiment, the colorimeter 480 can be an inline colorimeter (ICCU) (or spectrophotometer), which measures printed color patches in order to generate color profiles. In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 492 can connect the various components 410, 420, 430, 440, 450, 460, 470, 480, and 490 within the printer 30a, 30b. The printer 30a, 30b also includes an operating system (OS), which manages the computer hardware and provides common services for efficient execution of various software programs. In accordance with an exemplary embodiment, it can be within the scope of the disclosure for the printer 30a, 30b to be a copier.

For example, in accordance with an exemplary embodiment, an image processing section within the printer 30a, 30b can carry out various image processing under the control of a print controller or CPU 410, and sends the processed print image data to the print engine 4460. The image processing section can also include a scanner section (scanner engine 450) for optically reading a document, such as an image recognition system. The scanner section receives the image from the scanner engine 450 and converts the image into a digital image. The print engine 460 forms an image on a print media (or recording sheet) based on the image data sent from the image processing section. The central processing unit (CPU) (or processor) 410 and the memory 420 can include a program for RIP processing (Raster Image Processing), which is a process for converting print data included in a print job into Raster Image data to be used in the printer or print engine 460. The CPU 410 can include a printer controller configured to process the data and job information received from the one or more servers 10a, 10b, or the one or more client computers 20a, 20b, for example, received via the network connection unit and/or input/output section (I/O section) 490.

The CPU 410 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 20a, 20b to generate a print image.

In accordance with an exemplary embodiment, the network I/F 490 performs data transfer with the one or more servers 10a, 10b, and the one or more client devices 20a, 20b. The printer controller can be programmed to process data and control various other components of the multi-function peripheral to carry out the various methods described herein. In accordance with an exemplary embodiment, the operation of printer section commences when the printer section receives a page description from the one or more servers 10a, 10b, and the one or more client devices 20a, 20b via the network I/F 490 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 30a, 30b consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the printer 30a, 30b can also include at least one auto tray or paper tray 470, and more preferably a plurality of auto trays or paper trays. Each auto tray or paper tray 470 can include a bin or tray, which holds a stack of a print media (not shown), for example, a paper or a paper-like product. The printer engine or print engine 460 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the printer 30a, 30b, for example, on printer configuration settings of the printer 30a, 30b to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 5:
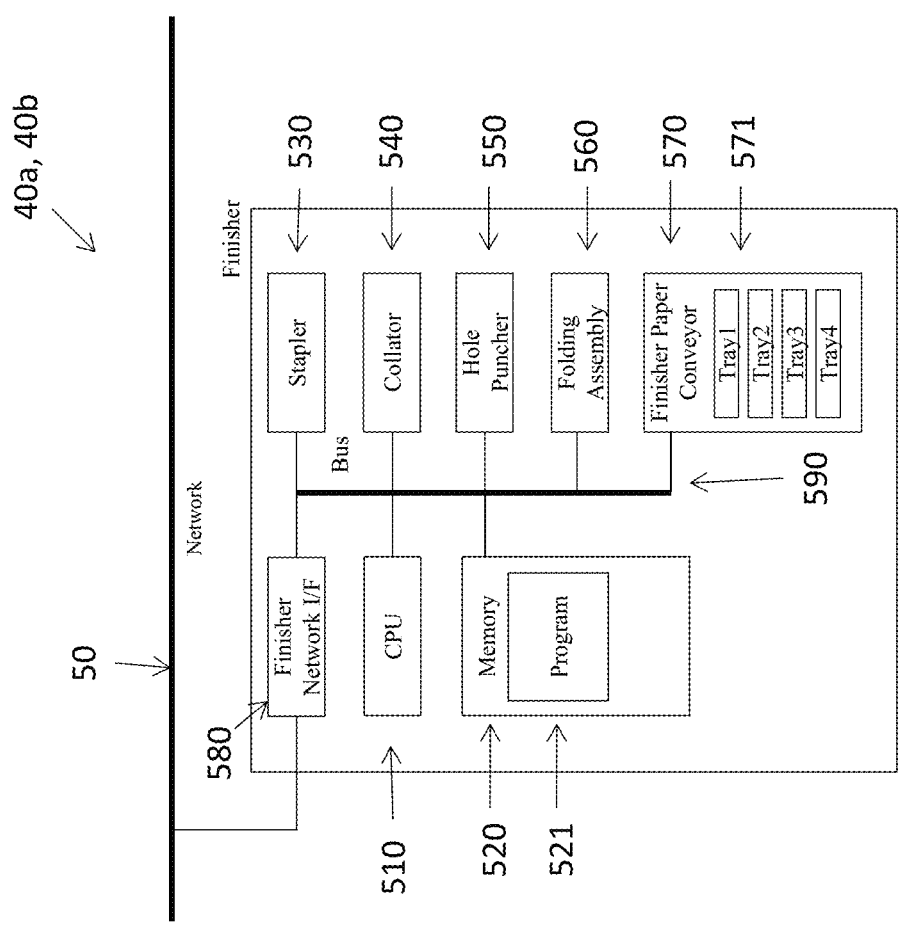
FIG. 5 is an illustration of a finisher in accordance with an exemplary embodiment.

FIG. 5 is an illustration of a finisher 40a, 40b in accordance with an exemplary embodiment. As shown in FIG. 5, the finisher 40*a*, 40*b* can include a network interface (I/F) 580, which is connected to the communication network (or network) 50, a processor or central processing unit (CPU) 510, and one or more memories 520 for storing software programs and data (such as files to be printed) 521. The processor or CPU 510 carries out the instructions of a computer program, which operates and/or controls at least a portion of the functionality of the finisher 40*a*, 40*b*. The finisher 40*a*, 40*b* can also include a stapler 530, a collator 540, a hole puncher 550, a folding assembly 560, and a finisher paper conveyor 570, which includes a plurality of trays 571. A bus 590 can connect the various components 510, 520, 530, 540, 550, 560, 570, and 580 within the finisher 40*a*, 40*b*. The finisher 40*a*, 40*b* also includes an operating system (OS), which manages the computer hardware and provides common services for efficient execution of various software programs.

The CPU 510 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the network I/F 580 performs data transfer with the one or more servers 10*a*, 10*b*, the one or more client devices 20*a*, 20*b*, and the one or more printers 30*a*, 30*b*.

FIG. 6 is a table 600 of definitions in accordance with an exemplary embodiment. As shown in FIG. 6, when a print job (i.e., a print request) is being printed by a printer 30*a*, 30*b*, an operator is concerned with the print volume (page count times copy count), printer running time (time that printer is turned on), printer printing time (time that printer is actually printing), printer stop time, for example, for maintenance, idle, and error, and RIP (raster image processing). The printing time of a printer 30*a*, 30*b* is equal to the printer running time minus the printer stop time. The printer stop time can be caused, for example, by maintenance (i.e., a service call), for example, for repairs to the print engine, idle, and errors. Idling of a printer 30*a*, 30*b* can be caused by, for example, no job, raster imaging processing, or errors in operation, for example, panel operation, front door open, paper feed trap open, paper tray full, paper tray empty, toner empty, and other, for example, printer engine troubles. Errors can include, for example, paper jams. RIP or raster image processing is the time it takes to convert a job (print job) to a raster image for printing.

Figures 7A, 7B:
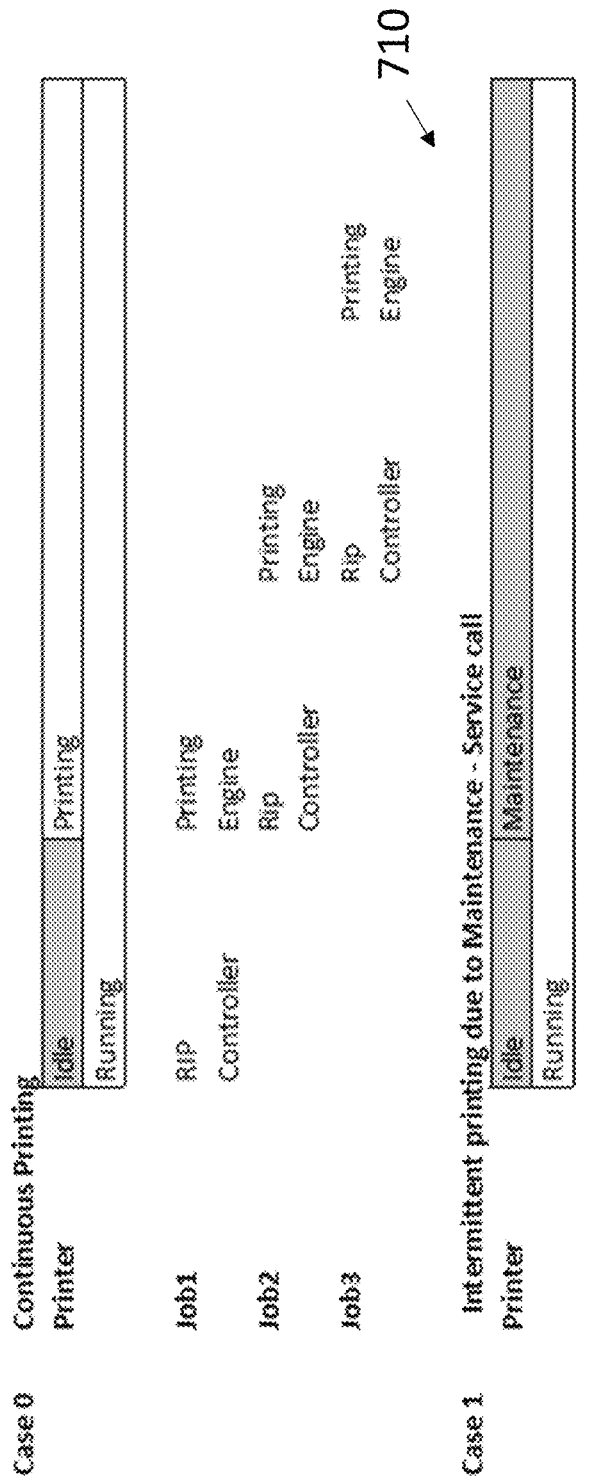
FIG. 7A is an illustration of an example of continuous printing of a print job in accordance with an exemplary embodiment.
FIG. 7B is an illustration of an example of an intermittent printing of a print job due to maintenance, for example, a service call
Figure 8A:
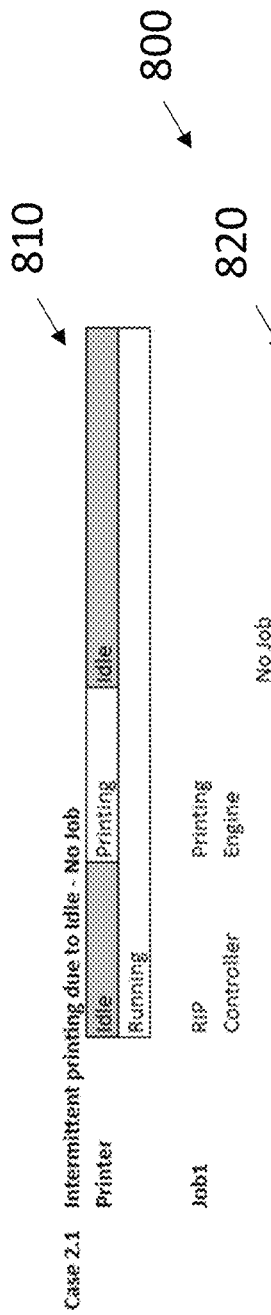
FIGS. 8A-8D are illustrations of examples of intermittent printing of print jobs due to idling of a printer.
Figure 8B:
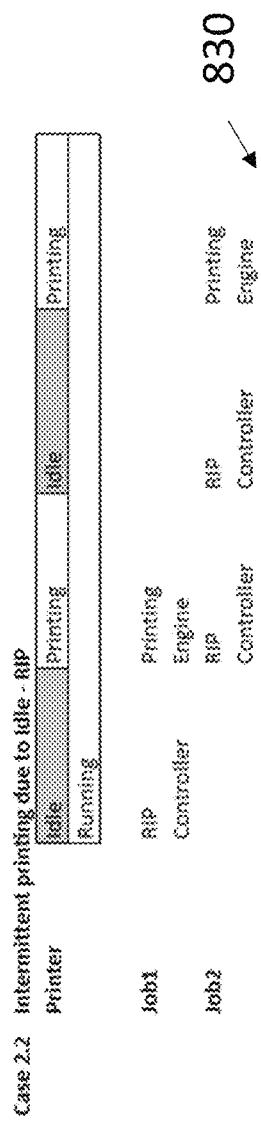
Figure 8C:
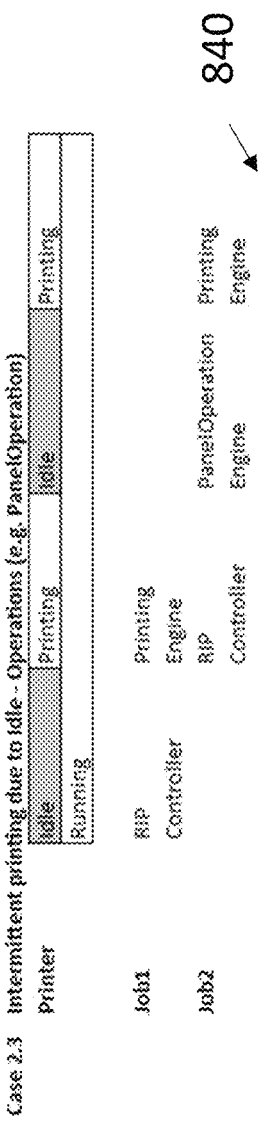
Figure 8D:
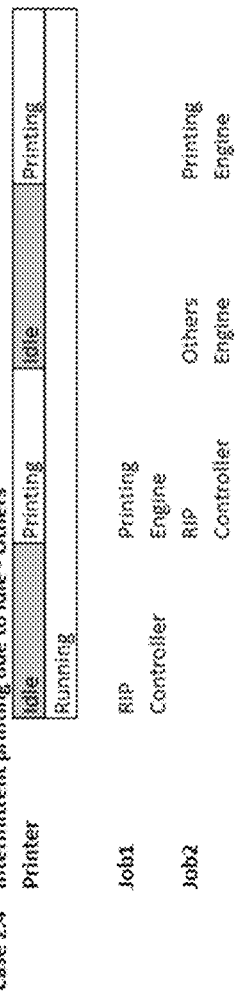

FIG. 7A is an illustration of an example of continuous printing of a print job 700 in accordance with an exemplary embodiment. As shown in FIG. 7A (Case 0), in the case of a continuous print job, the printer 30*a*, 30*b*, can receives plural jobs, each of the jobs (Job1, Job2, Job3) is converted into raster image for printing by the printer controller of the printer 30*a*, 30*b*, and once the conversion is completed, the job is printed. Prior to the printing of a print job by the printing engine, the printer 30*a*, 30*b* is running in an idle state.

FIG. 7B is an illustration of an example of an intermittent printing of a print job 710 due to maintenance, for example, a service call. As shown in FIG. 7B (Case 1), when a printer 30*a*, 30*b*, for example, experiences a paper jam, required maintenance, for example, replacement of toner or other related maintenance, the printer enters into a maintenance state (i.e., a service call has been placed).

FIGS. 8A-8D are illustrations of examples of intermittent printing of print jobs due to idling of a printer 30*a*, 30*b*. As shown in FIGS. 8A-8D, the printer 30*a*, 30*b* may be in an idle state as a result of no print job 810 (Case 2.1), the print job 820 (Case 2.2) is being converted into raster image for printing by the printer controller of the printer 30*a*, 30*b*, the user or operator may be inputting operations 830 (Case 2.3), for example, an open door on the printer 30*a*, 30*b* during refilling of paper in a paper tray, and/or or the other reasons 840 (Case 2.4).

Figure 9:
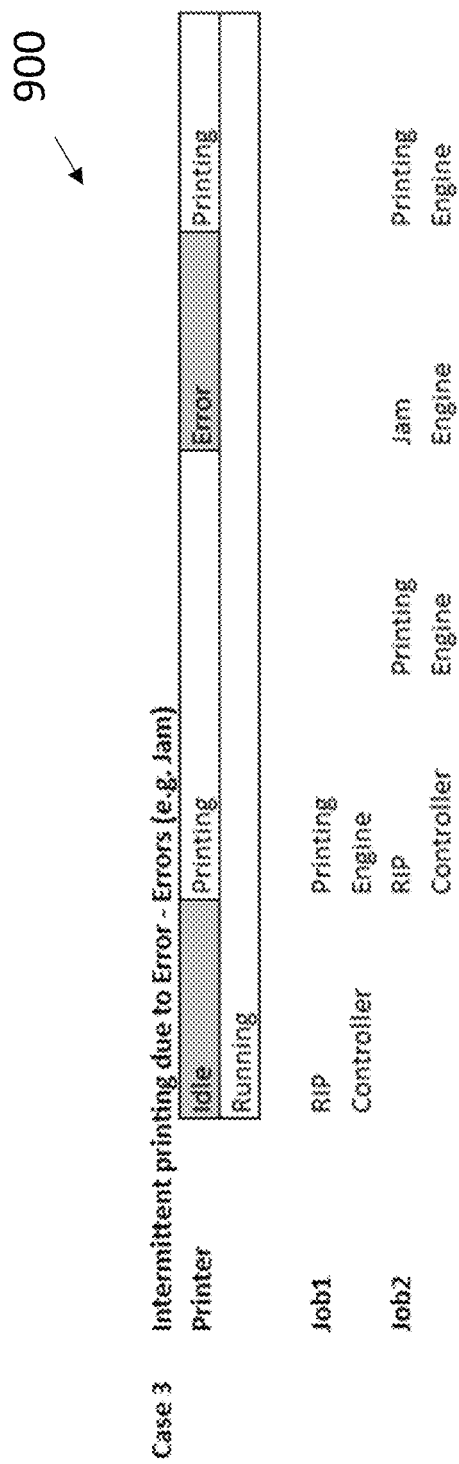
FIG. 9 is an illustration of an example of intermittent printing due to an error, for example, a paper jam.

FIG. 9 is an illustration of an example of intermittent printing 900 due to an error, for example, a paper jam. As shown in FIG. 9, the printer 30*a*, 30*b*, may undergo an intermittent printing status as a result of an error, for example, a paper jam (Case 3).

Figure 10:
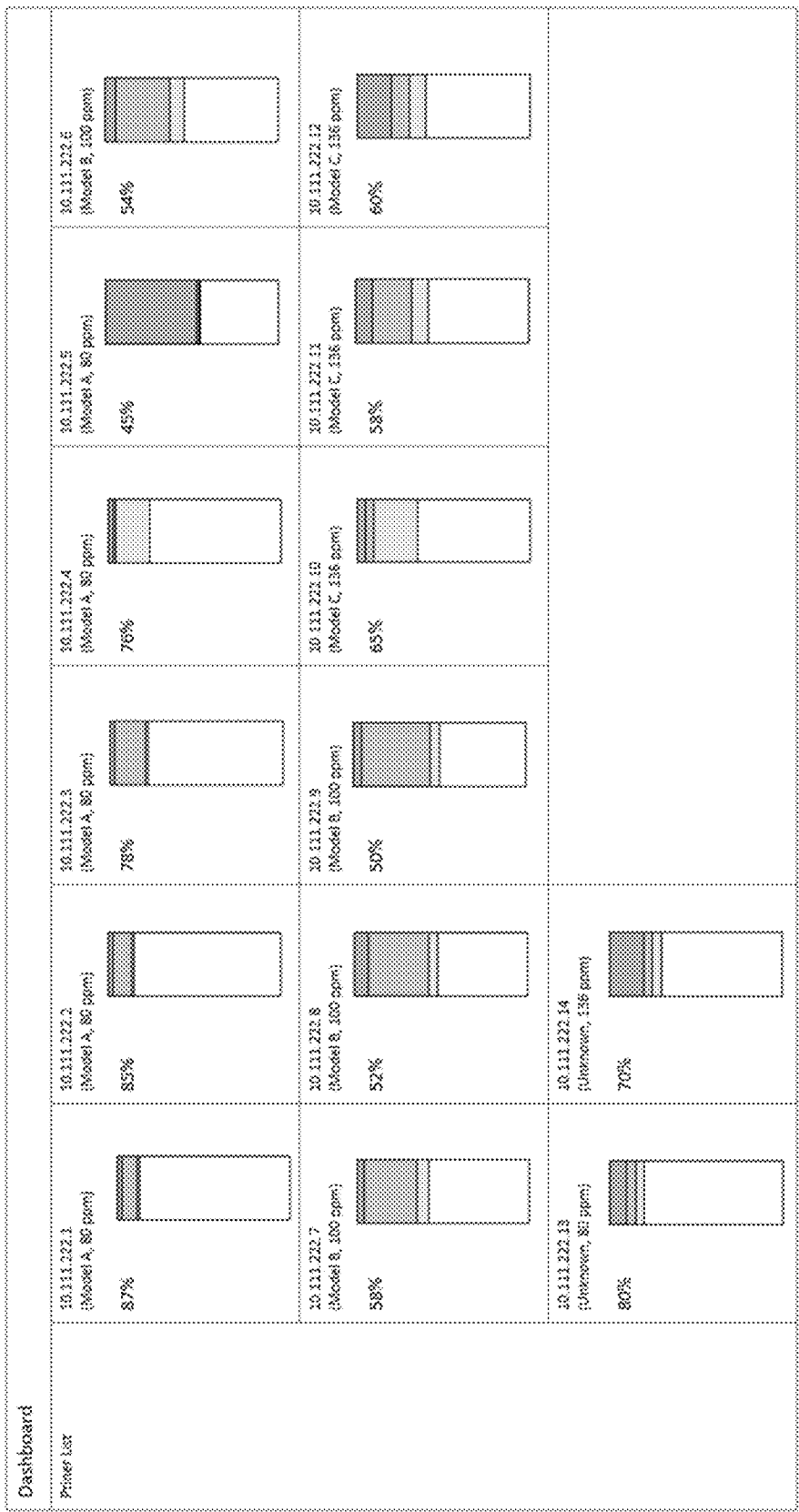
FIG. 10 is an illustration of an existing dashboard (user interface) showing a status for each of a plurality of printers.

FIG. 10 is an illustration of an existing dashboard (user interface) 1000 showing a status for each of a plurality of printers 30*a*, 30*b*. As shown in FIG. 10, existing dashboard show the plurality of printers 30*a*, 30*b* including model of printer and/or identifier, printing capabilities, for example, pages per minute (ppm), and usage, for example, as a percentage (%). The usage for each of the printers 30*a*, 30*b*, can be shown as printing (%), maintenance, idle, and error.

Figure 11:
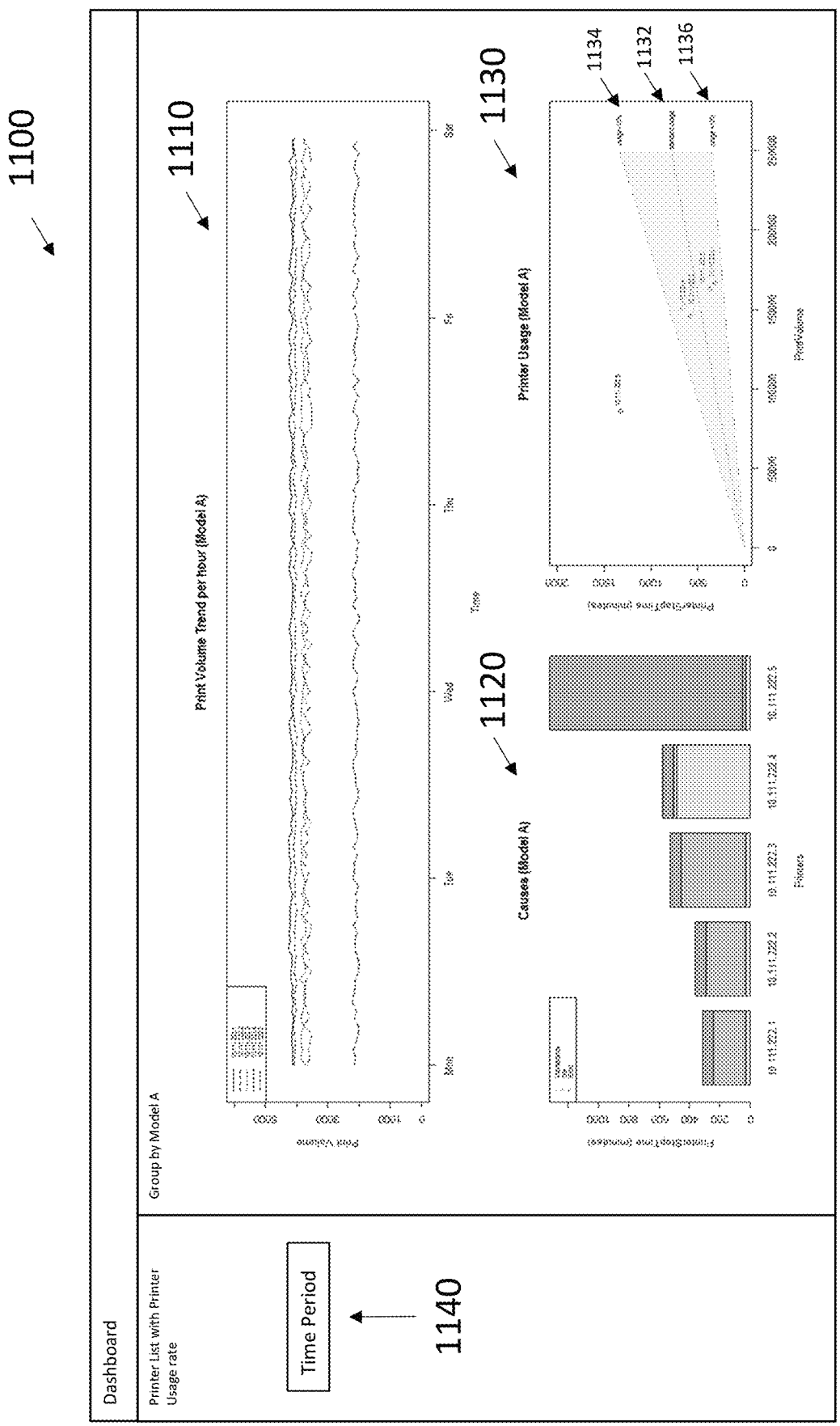
FIG. 11 is an illustration of a dashboard (user interface) in accordance with an exemplary embodiment.

FIG. 11 is an illustration of a dashboard (user interface) 1100 in accordance with an exemplary embodiment. As shown in FIG. 11, the dashboard 1100 can include a line chart (i.e., line graph) illustrating Print Volume Trend per Hour 1110 (i.e., Print Volume, for examples, pages versus Time (i.e., minutes, hours, and/or days)), a Cause bar chart 1120, Printer Usage scatter chart or graph 1130, and a Time Period menu 1140. The Time Period menu 1140 can be, for example, a drop down menu that can set the time period displayed on the Print Volume Trend per Hour 1110 line chart. In accordance with an exemplary embodiment, the line chart 1110 consists of two axes, a horizontal axis with "Time Series" and a vertical axis with "Print Volume", and wherein a print volume for each of the plurality of printers is plotted on the line chart of print volume.

In accordance with an exemplary embodiment, the Print Volume Trend per Hour line chart 1110 can be per model of printer 30*a*, 30, for example, each printer 30*a*, 30*b*, of a same or similar model can be grouped together and shown in the Print Volume Trent per Hour line chart 1110. Same or similar models can be, for example, based on printing capabilities including black and white and/or color, pages per minutes, finishing capabilities, print media available, etc., and/or can be based on manufacturer descriptions of the model type and/or specific model. As shown in FIG. 11, for example, a plurality of printers 30*a*, 30*b* (five (5) in this particular case) can be shown in a bar chart (or graph format) with print volume versus time (i.e., days).

In accordance with an exemplary embodiment, the bar chart 1120 can consist of two axes, horizontal axis can be, for example, an "IP Address" and/or an identifier of a printer 30*a*, 30*b*, and the vertical axis is "Printer Stop Time". In accordance with an exemplary embodiment, the bar chart 1120 can include printer stop time (for example, in minutes) for each of the plurality of printers, each of the plurality of printers having an identifier and a stacked bar chart divided into a maintenance section, an idle section, and an error section, and wherein the printer stop time is on a vertical axis and the each of the plurality of printers 30, 30*b*, on a horizontal axis. In accordance with an exemplary embodiment, each of the maintenance section, the idle section, and the error section can be displayed in the bar chart 1120 in a different color and/or a different hatching.

The scatter chart 1130 consists of two axes, the horizontal axis is "Print Volume", and the vertical axis is "Printer Stop Time", and includes a standard line, standard plus delta (Δ) line, and a stand minus delta (Δ) line, and the area between the standard plus delta line and the standard minus delta line is calculated to be a reasonable or desirable print usage for each of the printers 30a, 30b.

In accordance with an exemplary embodiment, the Printer Usage scatter chart (or graph) 1130 illustrates Printer Stop Time (minutes) versus Print Volume for each of the plurality of printers 30a, 30b, and wherein each printer 30a, 30b is plotted at a current point of printing on the scatter chart (or graph) 1130. The current point of printing being calculate over a predetermined or set period of time, for example, hourly, daily, and/or weekly. For example, the current point of printing can be the printer stop time versus print volume plotted for each of the plurality of printers for the last hour or plurality of hours, last 24 hours, and/or one or more days. In addition, the graph 1130 can include a standard usage line 1132 with plus 1134 or minus 1136 usage lines (i.e., a delta or Δ) to visually show if the printer 30a, 30b is currently printing within or outside the standard usage with a plus or minus percentage (for example, 10%). For example, as shown in FIG. 11, four (4) of the five (5) printers 30a, 30b, are operating within a standard usage within plus or minus 10% with one of the five printers outside the standard usage within plus or minus 10%.

In accordance with an exemplary embodiment, the time period for each of the line chart 1110, the bar chart 1120, and the scatter chart 1130 can be shown in accordance with the Time Period menu 1140, and/or alternatively, the Time Period drop 1140 can include a separate menu for each of the line chart 1110, the bar chart 1120, and/or the scatter chart 1130.

Figure 12A:
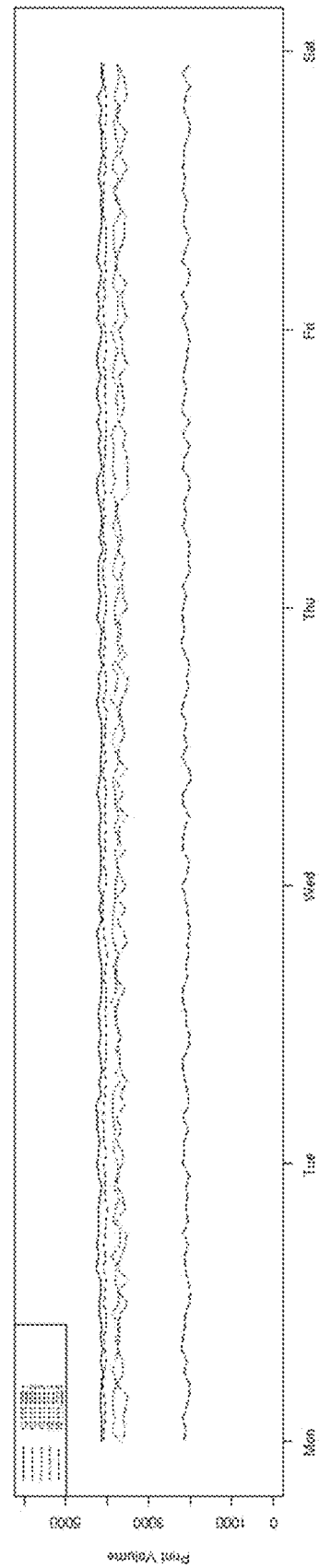
FIG. 12A is illustration of a line chart of print volume trend per hour for a plurality of printers in accordance with an exemplary embodiment.

FIG. 12A is illustration of a Print Volume Trend per hour line chart 1200 for a plurality of printers 30a, 30b in accordance with an exemplary embodiment. As shown in FIG. 12A, the Print Volume Trend per hour (Model A) line chart illustrates Print Volume versus Time for each of a plurality of printers 30a, 30b, and wherein each of the printers 30a, 30b, is a same or similar model.

Figure 12C:
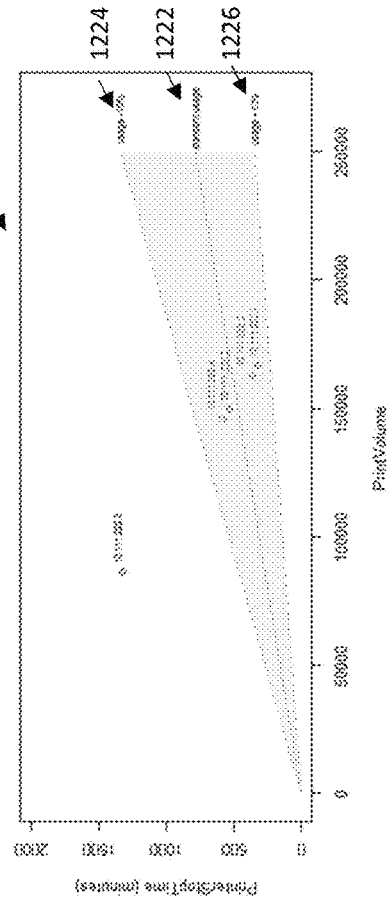
FIG. 12C is an illustration of scatter chart of printer usage for the plurality of printers in accordance with an exemplary embodiment.
Figure 12B:
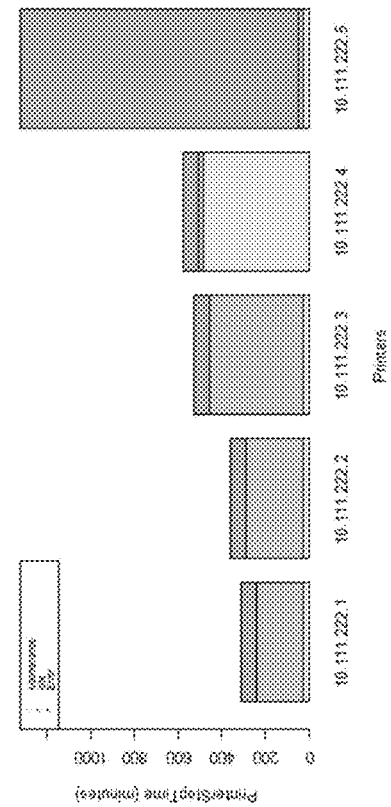
FIG. 12B is an illustration of a bar chart of printer stop time for the plurality of printers in accordance with an exemplary embodiment.

FIG. 12B is an illustration of a Cause (Model A) bar chart or printer stop time 1210 for the plurality of printers in accordance with an exemplary embodiment. As shown in FIG. 12B, the Cause bar chart 1210 can illustrate Printer Stop Time (for example, in minutes) for each of the plurality of printers 30a, 30b, with an illustration of different causes, for example, maintenance, idle, and/or error.

FIG. 12C is an illustration of a Printer Usage (Model A) scatter chart 1220 for the plurality of printers in accordance with an exemplary embodiment. As shown in FIG. 12C, the Printer Usage scatter chart (or graph) 1220 illustrates Printer Stop Time (minutes) versus Print Volume for each of the plurality of printers 30a, 30b, and wherein each printer 30a, 30b is plotted at a current point of printing on the scatter chart 1220. In addition, the scatter chart 1220 can include a standard usage line 1222 with plus 1224 or minus 1226 usage lines to visually show if the printer 30a, 30b is currently printing within or outside the standard usage with a plus or minus percentage (for example, 10%). For example, as shown in FIG. 12C, four (4) of the five (5) printers 30a, 30b, are operating within a standard usage within plus or minus 10% with one (1) of the five (5) printers outside the standard usage within plus or minus 10%.

Figures 13A, 13B, 13C:
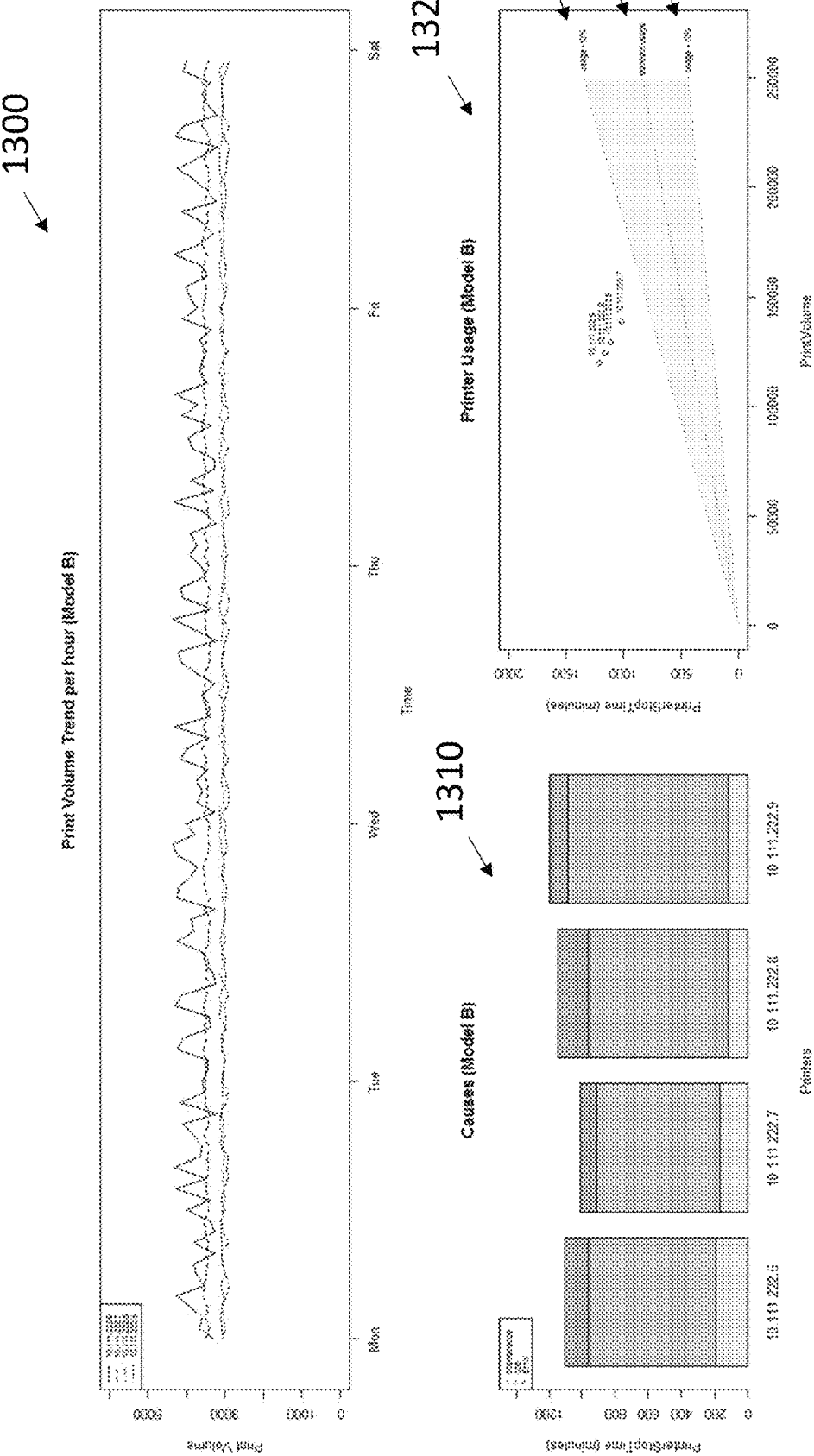
FIG. 13A is illustration of a line chart of print volume trend per hour for a plurality of printers in accordance with another exemplary embodiment.
FIG. 13B is an illustration of a bar chart of printer stop time for the plurality of printers in accordance with another exemplary embodiment.
FIG. 13C is an illustration of a scatter chart of printer usage for the plurality of printers in accordance with another exemplary embodiment.

FIG. 13A is illustration of Print Volume Trend per hour line chart 1300 for a plurality of printers in accordance with another exemplary embodiment. As shown in FIG. 13A, the Print Volume Trend per hour (Model B) line chart 1300 illustrates Print Volume versus Time for each of a plurality of printers 30a, 30b, and wherein each of the printers 30a, 30b, is a same or similar model.

FIG. 13B is an illustration of a Cause (Model B) bar chart 1310 (i.e., printer stop time) for the plurality of printers in accordance with another exemplary embodiment. As shown in FIG. 13B, the Cause bar chart 1310 can illustrate Printer Stop Time (for example, in minutes) for each of the plurality of printers 30a, 30b, with an illustration of different causes, for example, maintenance, idle, and/or error.

FIG. 13C is an illustration of Printer Usage (Model B) scatter chart 1320 for the plurality of printers in accordance with another exemplary embodiment. As shown in FIG. 13C, the Printer Usage scatter chart 1320 illustrates Printer Stop Time (minutes) versus Print Volume for each of the plurality of printers 30a, 30b, and wherein each printer 30a, 30b is plotted at a current point of printing on the scatter chart 1320. In addition, the scatter chart 1320 can include a standard usage line 1322 with plus 1324 or minus 1326 usage lines to visually show if the printer 30a, 30b is currently printing within or outside the standard usage with a plus or minus percentage (for example, 10%). For example, as shown in FIG. 13C, zero (0) of the five (5) printers 30a, 30b, are operating within a standard usage within plus or minus 10% with five (5) of the five (5) printers outside the standard usage within plus or minus 10%.

Figure 14A:
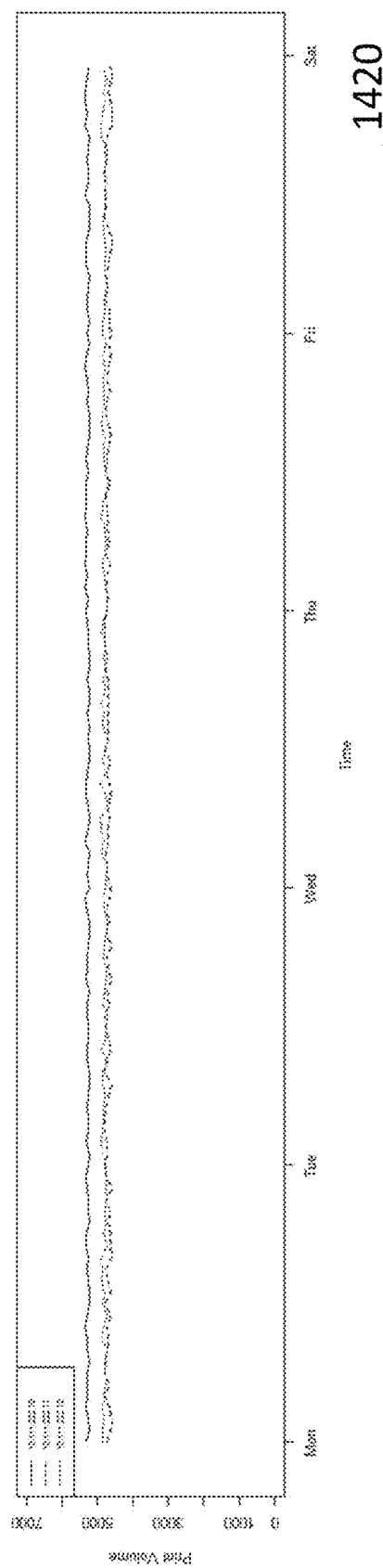
FIG. 14A is illustration of a line chart of print volume trend per hour for a plurality of printers in accordance with a further exemplary embodiment.

FIG. 14A is illustration of Print Volume Trend per hour (Model C) line chart 1400 for a plurality of printers 30a, 30b in accordance with a further exemplary embodiment. As shown in FIG. 14A, the Print Volume Trend per hour (Model C) line chart 1400 illustrates Print Volume versus Time for each of a plurality of printers 30a, 30b, and wherein each of the printers 30a, 30b, is a same or similar model.

Figure 14C:
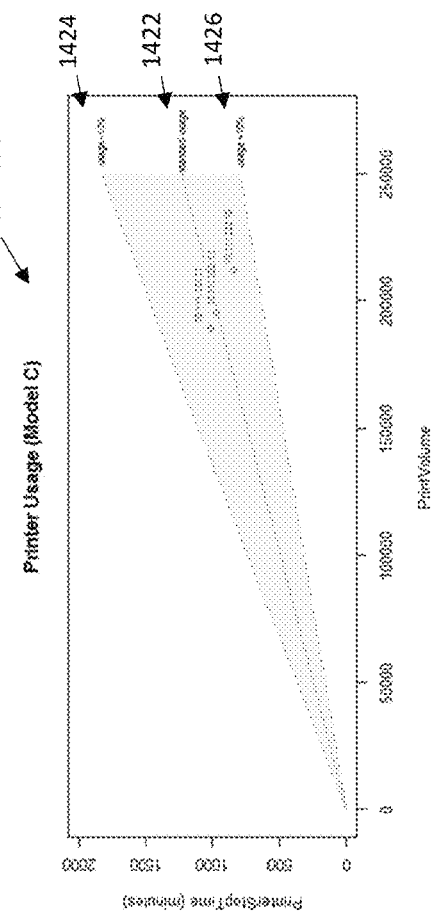
FIG. 14C is an illustration of a scatter chart of printer usage for the plurality of printers in accordance with a further exemplary embodiment.
Figure 14B:
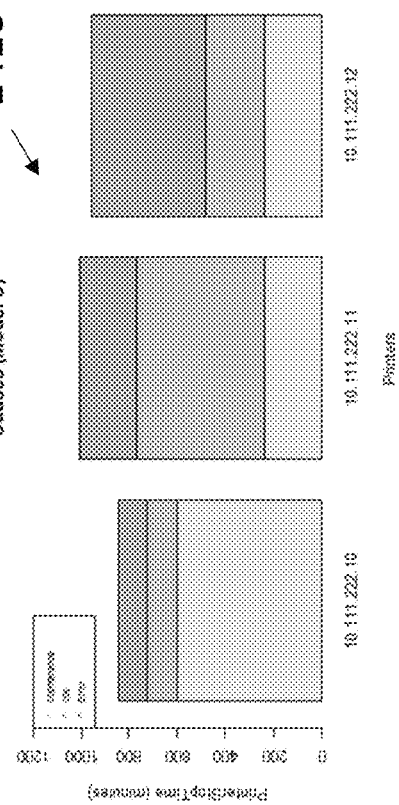
FIG. 14B is an illustration of a bar chart of printer stop time for the plurality of printers in accordance with a further exemplary embodiment.

FIG. 14B is an illustration of Causes (Model C) bar chart 1410 (i.e., printer stop time) for the plurality of printers in accordance with a further exemplary embodiment. As shown in FIG. 14B, the Cause bar chart 1410 can illustrate Printer Stop Time (for example, in minutes) for each of the plurality of printers 30a, 30b, with an illustration of different causes, for example, maintenance, idle, and/or error.

FIG. 14C is an illustration of printer usage for the plurality of printers in accordance with a further exemplary embodiment. As shown in FIG. 14C, the Printer Usage scatter chart 1420 illustrates Printer Stop Time (minutes) versus Print Volume for each of the plurality of printers 30a, 30b, and wherein each printer 30a, 30b is plotted at a current point of printing on the scatter chart 1420. In addition, the scatter chart 1420 can include a standard usage line 1422 with plus 1424 or minus 1426 usage lines to visually show if the printer 30a, 30b is currently printing within or outside the standard usage with a plus or minus percentage (for example, 10%). For example, as shown in FIG. 14C, three (3) of the three (3) printers 30a, 30b, are operating within a standard usage within plus or minus 10% with zero (0) of the three (3) printers outside the standard usage within plus or minus 10%.

Figures 15A, 15B, 15C:
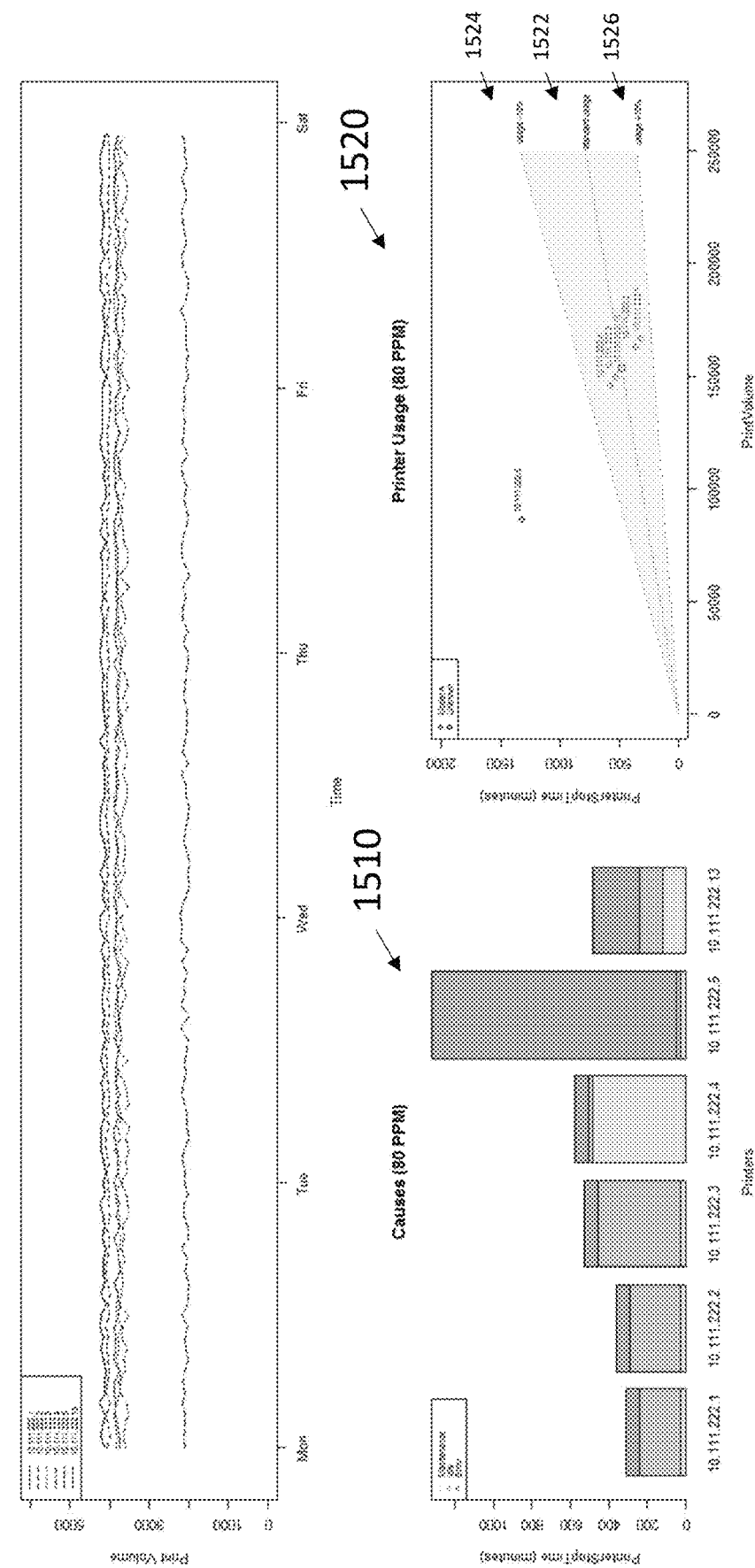
FIG. 15A is illustration of a line chart of print volume trend per hour for a plurality of printers in accordance with an exemplary embodiment.
FIG. 15B is an illustration of a bar chart of printer stop time for the plurality of printers in accordance with an exemplary embodiment.
FIG. 15C is an illustration of a scatter chart of printer usage for the plurality of printers in accordance with an exemplary embodiment.

FIG. 15A is illustration of Print Volume Trend per hour line chart (80 pages per minute (PPM) 1500 for a plurality of printers in accordance with another exemplary embodiment. As shown in FIG. 15A, the Print Volume Trend per hour (80 PPM) line chart 1500 illustrates Print Volume versus Time for each of a plurality of printers 30a, 30b, and wherein each of the printers 30a, 30b, print a certain number of pages per minute (PPM), for example, 80 pages per minute (PPM).

FIG. 15B is an illustration of a Cause (80 PPM) bar chart 1510 (i.e., printer stop time) for the plurality of printers in accordance with another exemplary embodiment. As shown in FIG. 15B, the Cause bar chart 1510 can illustrate Printer Stop Time (for example, in minutes) for each of the plurality of printers 30a, 30b, with an illustration of different causes, for example, maintenance, idle, and/or error. For example, as shown in FIG. 15B, the fifth (5th) of the six printers 30a, 30, has excessive error with printer stop time exceeding 1000 minutes relative to the other five printers 30a, 30b, which each have less than 600 minutes of total printer stop time.

FIG. 15C is an illustration of Printer Usage (80 PPM) scatter chart 1520 for the plurality of printers in accordance with another exemplary embodiment. As shown in FIG. 15C, the Printer Usage scatter chart 1520 illustrates Printer Stop Time (minutes) versus Print Volume for each of the plurality of printers 30a, 30b, and wherein each printer 30a, 30b is plotted at a current point of printing on the scatter chart 1520. In addition, the scatter chart 1520 can include a standard usage line 1522 with plus 1524 or minus 1526 usage lines to visually show if the printer 30a, 30b is currently printing within or outside the standard usage with a plus or minus percentage (for example, 10%). For example, as shown in FIG. 15C, five (5) of the six (6) printers 30a, 30b, are operating within a standard usage within plus or minus 10% with one (1) of the six (6) printers outside the standard usage within plus or minus 10%.

Figures 16A, 16B, 16C:
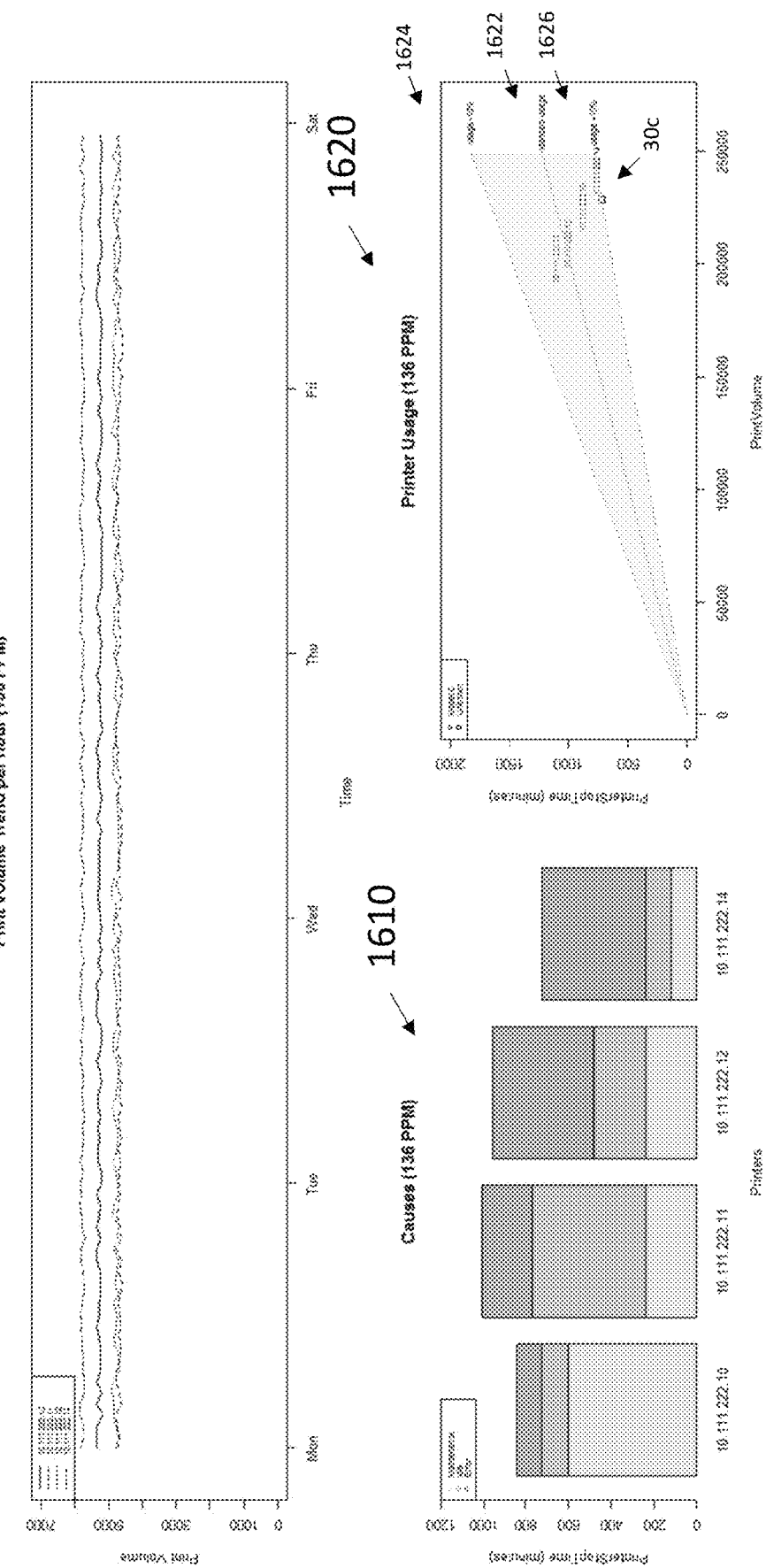
FIG. 16A is illustration of a line chart of print volume trend per hour for a plurality of printers in accordance with another exemplary embodiment.
FIG. 16B is an illustration of a bar chart of printer stop time for the plurality of printers in accordance with another exemplary embodiment.
FIG. 16C is an illustration of a scatter chart of printer usage for the plurality of printers in accordance with another exemplary embodiment.

FIG. 16A is illustration of Print Volume Trend per hour (136 PPM) line chart 1600 for a plurality of printers 30a, 30b in accordance with a further exemplary embodiment. As shown in FIG. 16A, the Print Volume Trend per hour (136 PPM) line chart 1600 illustrates Print Volume versus Time for each of a plurality of printers 30a, 30b, and wherein each of the printers 30a, 30b has a printing capacity of approximately 136 pages per minute (PPM).

FIG. 16B is an illustration of a Cause (136 PPM) bar chart 1610 (i.e., printer stop time) for the plurality of printers in accordance with another exemplary embodiment. As shown in FIG. 16B, the Cause bar chart 1610 can illustrate Printer Stop Time (for example, in minutes) for each of the plurality of printers 30a, 30b, with an illustration of different causes, for example, maintenance, idle, and/or error.

FIG. 16C is an illustration of Printer Usage (136 PPM) scatter chart 1620 for the plurality of printers in accordance with another exemplary embodiment. As shown in FIG. 16C, the Printer Usage scatter chart 1620 illustrates Printer Stop Time (minutes) versus Print Volume for each of the plurality of printers 30a, 30b, and wherein each printer 30a, 30b is plotted at a current point of printing on the scatter chart 1620. In addition, the scatter chart 1620 can include a standard usage line 1622 with plus 1624 or minus 1626 usage lines to visually show if the printer 30a, 30b is currently printing within or outside the standard usage with a plus or minus percentage (for example, 10%). For example, as shown in FIG. 16C, four (4) of the four (4) printers 30a, 30b, are operating within a standard usage within plus or minus 10% with zero (0) of the four (4) printers outside the standard usage within plus or minus 10%. However, as shown in FIG. 16C, the one unknown model printer 30c is on the border of being within an acceptable range.

FIG. 17A is a chart 1700 illustrating capabilities of a plurality of printers in accordance with an exemplary embodiment. As shown in FIG. 17, the capabilities of each of the printers 30a, 30b, for example, within a print shop can be stored, for example, in a memory of a server 10a, 10b. The capabilities of each of the printers 30a, 30b, can include maker of the printer (i.e., Konica Minolta or Company A), model, pages per minute (PPM), a standard usage rate (%), and corresponding lines for standard usage, plus a certain percentage from the standard usage (i.e., 5% to 25%, for example, 10%), and a minus a certain percentage from the standard usage (i.e., −5% to −25%, for example, −10%)

FIG. 17B is an illustration of chart 1710 showing how to calculate gradient in accordance with an exemplary embodiment. The line for a standard usage rate is equal to Printer Running Time×(1−Standard Usage rate)/pages per minute (PPM) times Running Time times Standard Usage rate. The line for minus delta usage rate is equal to Printer Running Time×(1−Standard Usage rate−delta)/pages per minute (PPM) times Running Time times (Standard Usage rate−delta). The line for plus delta usage rate is equal to Printer Running Time×(1−Standard Usage rate plus delta)/pages per minute (PPM) times Running Time times (Standard Usage rate plus delta). As set forth herein, the delta (a), for example, can be 5% to 25%, for example, 5%, 10%, 15%, 20%, and/or 25%.

FIG. 18 is an illustration of a chart 1800 showing data from a plurality of printers in accordance with an exemplary embodiment. As shown in FIG. 18, sample data from a plurality of printers 30a, 30b, can include, for example, IP address of each of the plurality of printers 30a, 30b, the manufacturer of each of the plurality of printers, for example, Konica Minolta, model or type of printer 30a, 30b, the printing capacity of the printer in pages per minute (PPM), the print volume for each of the plurality of printers 30a, 30b, over the sample period (i.e., one week of 8 hour days times 5 days), Printer Stop Time (minutes), Actual Usage Rate (%), Maintenance (minutes), idle (minutes), and error (minutes). For example, the chart 1800 can be based on x number of printers, for example, 14 printers as shown in FIG. 18 over one week, i.e., 8 hours a day times 5 days.

FIG. 19A is an illustration of a chart 1900 illustrating print capabilities of printer in accordance with an exemplary embodiment. As shown in FIG. 19A, each of the one or more printers 30a, 30b, can have a standard usage, and an adjusted standard.

FIG. 19B is an illustration of a chart 1910 illustrating how to adjust usage in accordance with an exemplary embodiment. As shown in FIG. 19B, the adjusted standard can be an average of print usage for certain models and/or types of printers 30a, 30b, for a plurality of printers 30a, 30b, for example, in a print shop. In accordance with an exemplary embodiment, the adjusted standard can be used, for example, to compare performance of a plurality of printers 30a, 30b within a print shop.

Figure 20B:
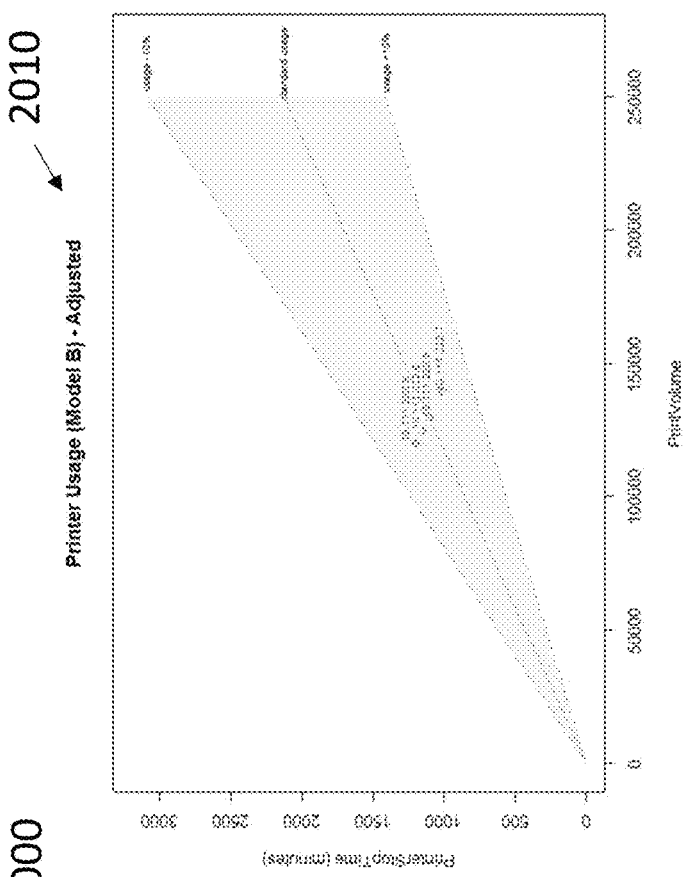
FIG. 20B is an illustration of a scatter chart showing adjusted printer usage in accordance with an exemplary embodiment.
Figure 20A:
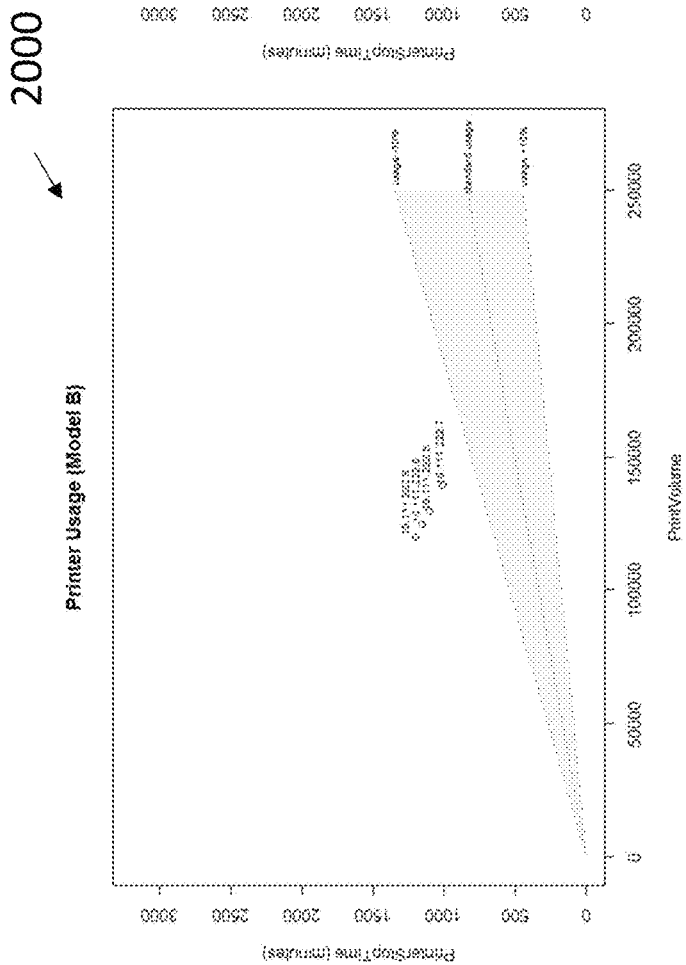
FIG. 20A is an illustration of a scatter chart showing printer usage in accordance with an exemplary embodiment.

FIG. 20A is an illustration of a scatter chart 2000 in the form of a scatter chart showing printer usage (Model B) in accordance with an exemplary embodiment. As shown in FIG. 20A, the printer usage for each of the four printers 30a, 30b (Model B) is outside of the preferred usage rate or window.

FIG. 20B is an illustration of a scatter chart 2010 in the form of scatter chart showing adjusted printer usage in accordance with an exemplary embodiment. As shown in FIG. 20B, the printer usage of each of the four printers 30a, 30b (Model B) is within the preferred adjusted rate or window, i.e., each of the printers is performing relatively equal.

FIG. 21A is an illustration of chart 2100 showing a first action for usage improvement for a printer in accordance with an exemplary embodiment. As shown in FIG. 21A, each of the one or more printers 30a, 30b, can have a standard usage, and a projected usage rate after, for example, a first action, i.e., Action A, upgrading the printer 30a, 30b, with a new computer processing unit (CPU).

FIG. 21B is an illustration of a chart 2110 showing a second action for usage improvement for a printer in accordance with an exemplary embodiment. As shown in FIG. 21B, each of the one or more printers 30a, 30b, can have a standard usage, and a projected usage rate after, for example, a second action, i.e., Action B, replacing the printers 30a, 30b, with new printers 30a, 30b. For example, the new printers 30a, 30b, can be a same or different model and/or having a different printing capacity.

Figures 22A, 22B:
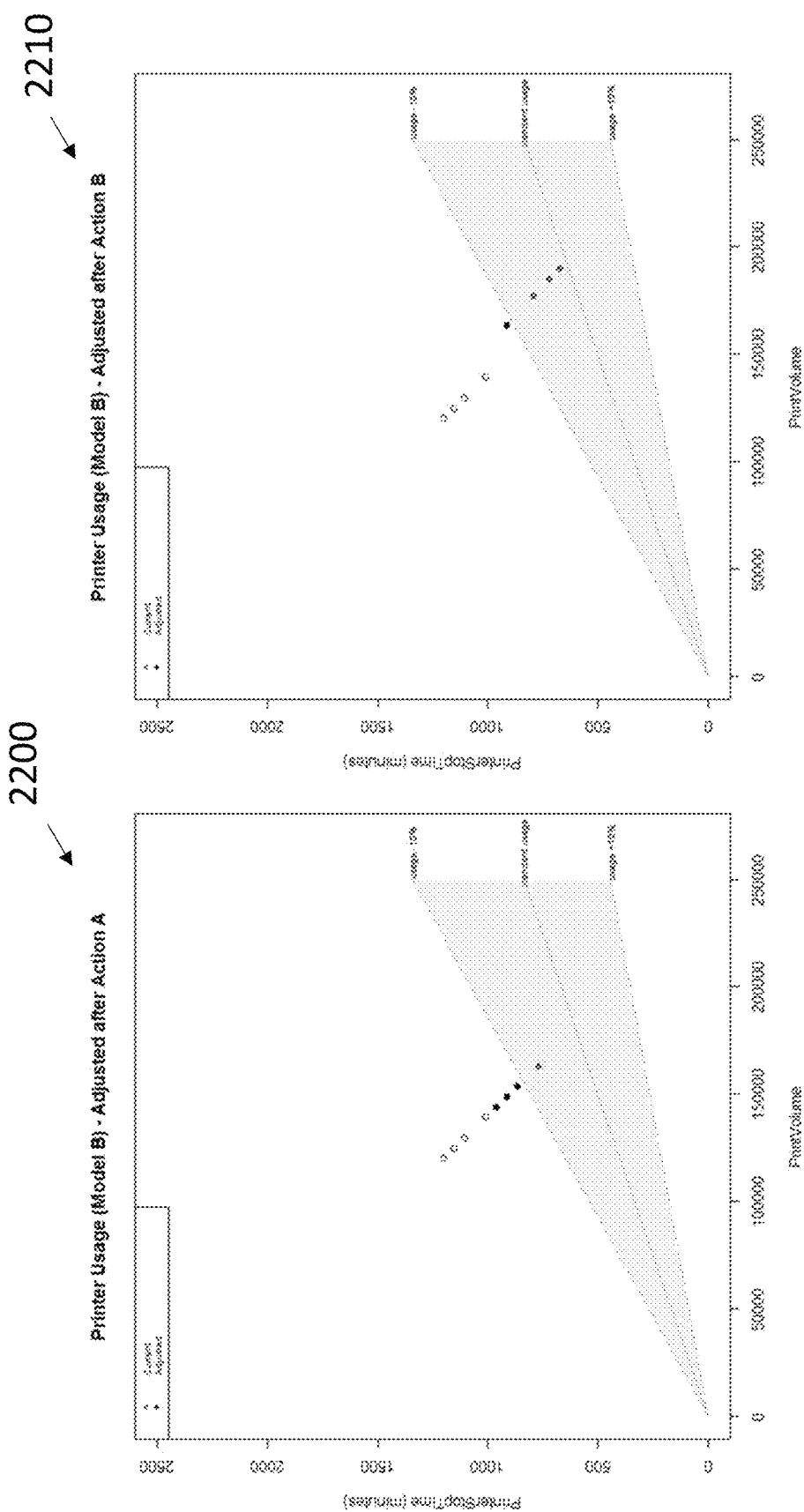
FIG. 22A is an illustration of a scatter chart showing printer usage in accordance with an exemplary embodiment in accordance with the first action as shown in FIG. 21A.
FIG. 22B is an illustration of a scatter chart showing printer usage in accordance with an exemplary embodiment in accordance with the second action as shown in FIG. 21B.

FIG. 22A is an illustration of a scatter chart 2200 in the form of a scatter chart showing printer usage in accordance with an exemplary embodiment in accordance with the first action as shown in FIG. 21A. As shown in FIG. 22A, the printer usage for each of seven or the eight 30a, 30b (Model B) is outside of the preferred usage rate or window after adjustment for the first action (i.e., Action A, the upgrading of the CPU on each of the printers 30a, 30b).

FIG. 22B is an illustration of a scatter chart 2210 in the form of a scatter chart showing printer usage in accordance with an exemplary embodiment in accordance with the second action as shown in FIG. 21B. As shown in FIG. 22B, the printer usage of four of the eight printers 30a, 30b after the second action (i.e., New Model (Action B)) is outside of preferred adjusted rate or window, one of the eight printers 30a, 30b, is just outside of the preferred window, and three of the eight printers 30a, 30b, are within the preferred window.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for comparing usage of plural printers, the method comprising:
collecting print information on each of a plurality of printers, the print information including print volume, printer run time, printer print time, printer stop time, and raster image processing time; and
displaying, on a graphical user interface, a printer usage dashboard, the printer usage dashboard including a line chart of print volume for the plurality of printers, a bar chart of printer stop time for each of the plurality of printers, and a scatter chart indicating a relationship between the print volume and the printer stop time for the plurality of printers.

2. The method according to claim 1, wherein the line chart of print volume for the plurality of printers includes print volume on a vertical axis and a time line on a horizontal axis, the method comprising:
plotting a print volume for each of the plurality of printers on the line chart of print volume.

3. The method according to claim 1, wherein the bar chart of printer stop time for each of the plurality of printers includes an identifier and a stacked bar chart divided into a maintenance section, an idle section, and an error section, and wherein the printer stop time is on a vertical axis and the each of the plurality of printers on a horizontal axis, the method comprising:
displaying a printer stop time for each of the plurality of printers in the stacked bar chart.

4. The method according to claim 3, wherein idle section includes idle time for each of the plurality of printers, the idle times including a printer having no print jobs in a print queue, raster imaging processing time of a print job on the printer, and an operation causing the printer to be in an idle state.

5. The method according to claim 3, further comprising:
displaying each of the maintenance section, the idle section, and the error section in the stacked bar chart in a different color and/or with a different hatching.

6. The method according to claim 1, wherein the scatter chart indicating the relationship between the print volume and the printer stop time for the plurality of printers includes the printer stop time on a vertical axis and the print volume on a horizontal axis, the method comprising:
plotting a standard line for printer stop time to print volume, the standard line being a calculated printer stop time to print volume for all of the plurality of printers;
plotting a standard line plus a delta for the printer stop time to print volume;
plotting a standard line minus the delta for the printer stop time to print volume, the standard line plus the delta for the printer stop time to print volume and the standard line minus the delta for the printer stop time to print volume forming a cone shape of a desired printer usage; and
plotting coordinates for each of the plurality of printers on the scatter chart indicating the relationship between the print volume and the printer stop time calculated for a predetermined time period.

7. The method according to claim 6, wherein the delta is a percentage of the standard.

8. The method according to claim 1, wherein the plurality of printers comprises a group of printers of a same printer model and/or a print capacity, the print capacity being in prints per minute.

9. A non-transitory computer readable medium (CRM) storing computer program code executed by a computer processor that performs a process for comparing usage of plural printers, the process comprising:
collecting print information on each of a plurality of printers, the print information including print volume, printer run time, printer print time, printer stop time, and raster image processing time; and
displaying, on a graphical user interface, a printer usage dashboard, the printer usage dashboard including a line chart of print volume for the plurality of printers, a bar chart of printer stop time for each of the plurality of printers, and a scatter chart indicating a relationship between the print volume and the printer stop time for the plurality of printers.

10. The computer readable medium according to claim 9, wherein the line chart of print volume for the plurality of printers includes print volume on a vertical axis and a time line on a horizontal axis, the method comprising:

plotting a print volume for each of the plurality of printers on the line chart of print volume.

11. The computer readable medium according to claim 9, wherein the bar chart of printer stop time for each of the plurality of printers includes an identifier and a stacked bar chart divided into a maintenance section, an idle section, and an error section, and wherein the printer stop time is on a vertical axis and the each of the plurality of printers on a horizontal axis, the method comprising:
displaying a printer stop time for each of the plurality of printers in the stacked bar chart.

12. The computer readable medium according to claim 11, wherein idle section includes idle time for each of the plurality of printers, the idle times including a printer having no print jobs in a print queue, raster imaging processing time of a print job on the printer, and an operation causing the printer to be in an idle state.

13. The computer readable medium according to claim 11, further comprising:
displaying each of the maintenance section, the idle section, and the error section in the bar chart in a different color and/or with a different hatching.

14. The computer readable medium according to claim 9, wherein the scatter chart indicating the relationship between the print volume and the printer stop time for the plurality of printers includes the printer stop time on a vertical axis and the print volume on a horizontal axis, the method comprising:
plotting a standard line for printer stop time to print volume, the standard line being a calculated printer stop time to print volume for all of the plurality of printers;
plotting a standard line plus a delta for the printer stop time to print volume;
plotting a standard line minus the delta for the printer stop time to print volume, the standard line plus the delta for the printer stop time to print volume and the standard line minus the delta for the printer stop time to print volume forming a cone shape of a desired printer usage; and
plotting coordinates for each of the plurality of printers on the scatter chart indicating the relationship between the print volume and the printer stop time calculated for a predetermined time period.

15. The computer readable medium according to claim 14, wherein the delta is a percentage of the standard.

16. The computer readable medium according to claim 9, wherein the plurality of printers comprises a group of printers of a same printer model and/or a print capacity, the print capacity being in prints per minute.

17. A system for comparing usage of plural printers, the system comprising:
a plurality of printers, each of the plurality of printers configured to print a plurality of print jobs;
a computer processor, the computer processor configured to:
collect print information on each of the plurality of printers, the print information including print volume, printer run time, printer print time, printer stop time, and raster image processing time; and
a graphical user interface configured to display a printer usage dashboard, the printer usage dashboard including a line chart of print volume for the plurality of printers, a bar chart of printer stop time for each of the plurality of printers, and a scatter chart indicating a relationship between the print volume and the printer stop time for the plurality of printers.

18. The system according to claim 17, wherein,
the line chart of print volume for the plurality of printers includes print volume on a vertical axis and a time line on a horizontal axis, and plotting a print volume is plotted for each of the plurality of printers on the line chart of print volume;
the bar chart of printer stop time for each of the plurality of printers includes an identifier and a stacked bar chart divided into a maintenance section, an idle section, and an error section, and wherein the printer stop time is on a vertical axis and the each of the plurality of printers on a horizontal axis, a printer stop time is displayed for each of the plurality of printers in the stacked bar chart;
wherein idle section includes idle time for each of the plurality of printers, the idle times including a printer having no print jobs in a print queue, raster imaging processing time of a print job on the printer, and an operation causing the printer to be in an idle state; and
each of the maintenance section, the idle section, and the error section in the bar chart is displayed in a different color and/or with a different hatching.

19. The system according to claim 17, wherein,
the scatter chart indicating the relationship between the print volume and the printer stop time for the plurality of printers includes the printer stop time on a vertical axis and the print volume on a horizontal axis;
a standard line is plotted for printer stop time to print volume, the standard line being a calculated printer stop time to print volume for all of the plurality of printers;
a standard line plus a delta is plotted for the printer stop time to print volume;
a standard line minus the delta is plotted for the printer stop time to print volume, the standard line plus the delta for the printer stop time to print volume and the standard line minus the delta for the printer stop time to print volume forming a cone shape of a desired printer usage; and
coordinates for each of the plurality of printers is plotted on the scatter chart indicating the relationship between the print volume and the printer stop time calculated for a predetermined time period.

20. The system according to claim 17, wherein the plurality of printers comprises a group of printers of a same printer model and/or a print capacity, the print capacity being in prints per minute.

* * * * *